US012771793B2

(12) United States Patent
Okuno

(10) Patent No.: US 12,771,793 B2
(45) Date of Patent: Oct. 20, 2026

(54) IMAGE HANDLING APPARATUS, EXTERNAL APPARATUS, INFORMATION DISPLAYING METHOD, AND MEDIUM FOR SELECTING BETWEEN FUNCTIONS

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 188 days.

(21) Appl. No.: 18/906,918

(22) Filed: Oct. 4, 2024

(65) Prior Publication Data

US 2025/0133172 A1 Apr. 24, 2025

(30) Foreign Application Priority Data

Oct. 24, 2023 (JP) ................................ 2023-182630

(51) Int. Cl.
*H04N 1/00* (2006.01)

(52) U.S. Cl.
CPC ....... *H04N 1/0048* (2013.01); *H04N 1/00209* (2013.01); *H04N 1/00244* (2013.01); *H04N 1/00416* (2013.01); *H04N 1/00474* (2013.01); *H04N 2201/0094* (2013.01)

(58) Field of Classification Search
CPC ............. H04N 1/0048; H04N 1/00209; H04N 1/00244; H04N 1/00416; H04N 1/00474; H04N 2201/0094; H04N 1/00413
See application file for complete search history.

(56) References Cited

U.S. PATENT DOCUMENTS

| | | | | |
|---|---|---|---|---|
| 2005/0134889 A1 | | 6/2005 | Nakazawa | |
| 2014/0118782 A1* | | 5/2014 | Tamai | H04N 1/00474 358/1.15 |
| 2015/0220289 A1 | | 8/2015 | Teruya et al. | |
| 2016/0119491 A1 | | 4/2016 | Takeda | |
| 2019/0007575 A1 | | 1/2019 | Hirakata et al. | |
| 2022/0060597 A1* | | 2/2022 | Adachi | H04N 1/00413 |

FOREIGN PATENT DOCUMENTS

| | | | |
|---|---|---|---|
| JP | 2005-153418 | A | 6/2005 |
| JP | 2013-27028 | A | 2/2013 |
| JP | 2015-165380 | A | 9/2015 |
| JP | 2016-81485 | A | 5/2016 |
| JP | 2019-8719 | A | 1/2019 |
| JP | 2021-182705 | A | 11/2021 |

* cited by examiner

*Primary Examiner* — Juan M Guillermety
(74) *Attorney, Agent, or Firm* — Merchant & Gould P.C.

(57) ABSTRACT

There is provided an image handling apparatus including: an image handler configured to perform reading of a document and/or recording of an image to a medium; a display; an interface configured to be operated by a user; and a controller configured to: perform control regarding additional and basic functions; cause the display to display a first screen including a first selecting part to be selected to select the basic function; cause the display to display, in response to selecting of the first selecting part, a second screen including a second selecting part to be selected to select a setting item of the basic function; and cause the display to display the second screen in a state that a third selecting part to be selected to select a setting item corresponding to the additional function is included in the second screen, in a case where the second screen is displayed.

14 Claims, 18 Drawing Sheets

IMAGE HANDLING APPARATUS, EXTERNAL APPARATUS, INFORMATION DISPLAYING METHOD, AND MEDIUM FOR SELECTING BETWEEN FUNCTIONS

REFERENCE TO RELATED APPLICATIONS

This application claims priority from Japanese Patent Application No. 2023-182630 filed on Oct. 24, 2023. The entire content of the priority application is incorporated herein by reference.

BACKGROUND ART

As an example of a recording apparatus, a multifunction peripheral having a plurality of different functions such as a copy function, a scanner function, a print function, a facsimile function, etc., is known. Such multifunction peripherals include a multifunction peripheral adopting a technique of connecting the multifunction peripheral to the Web through operating of an operation button to thereby add a new application which is not originally included in the multifunction peripheral so that the new application can be used in the multifunction peripheral.

SUMMARY

In some recording apparatuses, such as described above, to which an additional function can be added, a selecting part for selecting a basic function originally possessed by the recording apparatus, and a selecting part for selecting the additional function added to the recording apparatus are arranged on the same screen such as a home screen. Further, in a case where the selecting part for selecting the basic function is selected, a screen for performing a setting regarding the basic function is displayed; in a case where the selecting part for selecting the additional function is selected, a screen for performing a setting regarding the additional function is displayed. That is, the screen for performing the setting regarding the basic function and the screen for performing the setting regarding the additional function are different screens. On the other hand, the basic function and the additional function share many common setting items. In such a configuration, in a case where a user desires to change the function of the multifunction peripheral to the additional function from the basis function, after having set a setting item of the basic function, the user is required to switch between the screen for performing the setting regarding the basic function and the screen for performing the setting regarding the additional function, which takes labor for the user.

An object of the present disclosure is to provide an image handling apparatus, an external apparatus, an information displaying method, and a medium capable of reducing labor required for performing a setting regarding a basic function originally included in an image handling apparatus and a setting regarding an additional function added to the image handling apparatus.

According to a first aspect of the present disclosure, there is provided an image handling apparatus including:

an image handler configured to perform reading of a document and/or recording of an image to a medium;

a display;

an interface configured to be operated by a user; and a controller configured to:

perform control regarding an additional function and a basic function, the additional function being a function configured to become executable by the image handling apparatus after the image handling apparatus has been connected to an external apparatus, the basic function being a function executable by the image handling apparatus before and after the image handling apparatus has been connected to the external apparatus;

cause the display to display a first screen including a first selecting part configured to be selected by operating of the interface by the user to select the basic function;

cause the display to display, in response to selecting of the first selecting part, a second screen including a second selecting part configured to be selected by the operating of the interface by the user to select a setting item of the basic function corresponding to the first selecting part; and cause the display to display the second screen in a state that a third selecting part configured to be selected by the operating of the interface by the user to select a setting item corresponding to the additional function is included in the second screen, in a case where the second screen is displayed on the display.

According to a second aspect of the present disclosure, there is provided an external apparatus configured to communicate with the image handling apparatus of the first aspect, including:

a memory; and a controller configured to:

cause the memory of the external apparatus to store information indicating that execution of the additional function is selected in the image handling apparatus, in response to receiving of a first selection signal from the image handling apparatus, cause the memory of the external apparatus to store information indicating that the execution of the additional function is not selected in the image handling apparatus, in response to receiving of a second selection signal different from the first selection signal from the image handling apparatus, and perform control regarding the additional function, in response to receiving of a control instruction signal different from both the first selection signal and the second selection signal under a state that the information indicating that the execution of the additional function is selected is stored in the memory of the external apparatus.

According to a third aspect of the present disclosure, there is provided an external apparatus configured to communicate with the image handling apparatus of the first aspect, including:

a memory; and a controller configured to:

cause the memory of the external apparatus to store information indicating that execution of the additional function is selected in the image handling apparatus, in response to receiving of a selection signal from the image handling apparatus under a state that information indicating that execution of the additional function is not selected in the image handling apparatus is stored in the memory of the external apparatus;

cause the memory of the external apparatus to store information indicating that execution of the additional function is not selected in the image handling apparatus, in response to receiving of the selection signal from the image handling apparatus under a state that the information indicating that execution of the additional function is selected in the image handling apparatus is stored in the memory of the external apparatus; and perform control regarding the additional function, in response to receiving of a control instruction signal different from the selection signal under a state that the information indicating that the execution of the additional function is selected is stored in the memory of the external apparatus.

According to a fourth aspect of the present disclosure, there is provided an information displaying method executed by a controller of an image handling apparatus, the image handling apparatus including:

an image handler configured to perform reading of a document and/or recording of an image on a medium;

a display;

an interface configured to be operated by a user; and the controller, the method including:

causing the display to display a first screen including a first selecting part configured to be selected by operating of the interface by the user to select a basic function executable by the image handling apparatus before and after the image handling apparatus has been connected to an external apparatus;

causing the display to display, in response to selecting of the first selecting part, a second screen including a second selecting part configured to be selected by the operating of the interface by the user to select a setting item of the basic function corresponding to the first selecting part; and causing the display to display the second screen in a state that a third selecting part configured to be selected by the operating of the interface by the user to select a setting item corresponding to an additional function is included in the second screen, in a case where the second screen is displayed on the display, the additional function being a function configured to become executable by the image handling apparatus after the image handling apparatus has been connected to an external apparatus.

According to a fifth aspect of the present disclosure, there is provided a non-transitory and computer-readable medium storing a program executable by a controller of an image handling apparatus, the image handling apparatus including:

an image handler configured to perform reading of a document and/or recording of an image on a medium;

a display;

an interface configured to be operated by a user; and the controller, the program is configured to cause the controller to execute:

causing the display to display a first screen including a first selecting part configured to be selected by operating of the interface by the user to select, a basic function executable by the image handling apparatus before and after the image handling apparatus has been connected to an external apparatus;

causing the display to display, in response to selecting of the first selecting part, a second screen including a second selecting part configured to be selected by the operating of the interface by the user to select a setting item of the basic function corresponding to the first selecting part; and causing the display to display the second screen in a state that a third selecting part configured to be selected by the operating of the interface by the user to select a setting item corresponding to an additional function is included in the second screen, in a case where the second screen is displayed on the display, the additional function being a function configured to become made executable by the image handling apparatus after the image handling apparatus has been connected to an external apparatus.

In a present disclosure, in response to selection of a first selecting part of a first screen, a controller causes a display to display a second screen including a second selecting part for selecting a setting item regarding a basic function. Further, in a case where the controller causes the display to display the second screen, the controller causes the display to display the second screen including the second selecting part and a third selecting part for selecting a setting item of an additional function. With this, both selection of the setting item of the basic function and selection of the setting item of the additional function can be performed in a state that the second screen is displayed in the display. As a result, selection of a setting item common to the basic function and the additional function can be performed in the state that the second screen is displayed, and thus labor required for switching the screens can be reduced.

DESCRIPTION

In the following, an embodiment of the present disclosure will be described.

(Overall Configuration of Multifunction Peripheral)

Figure 1:
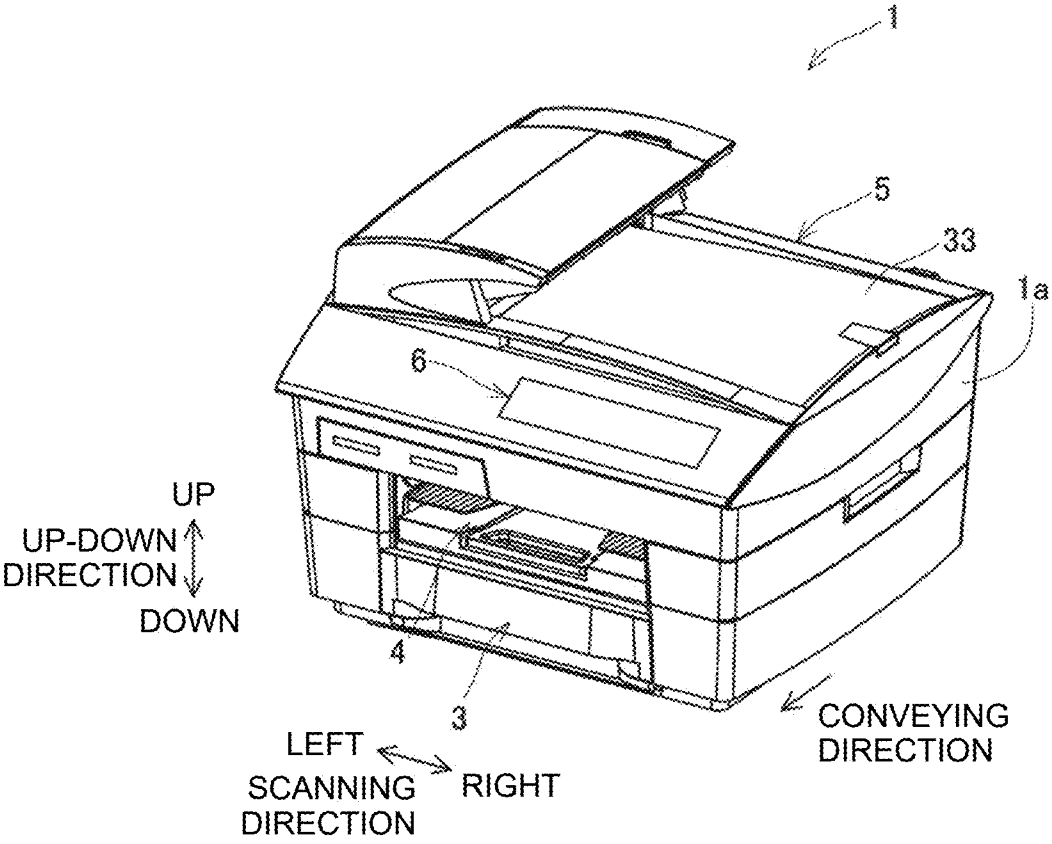
FIG. 1 is a diagram depicting a schematic configuration of a recording apparatus.
Figure 2:
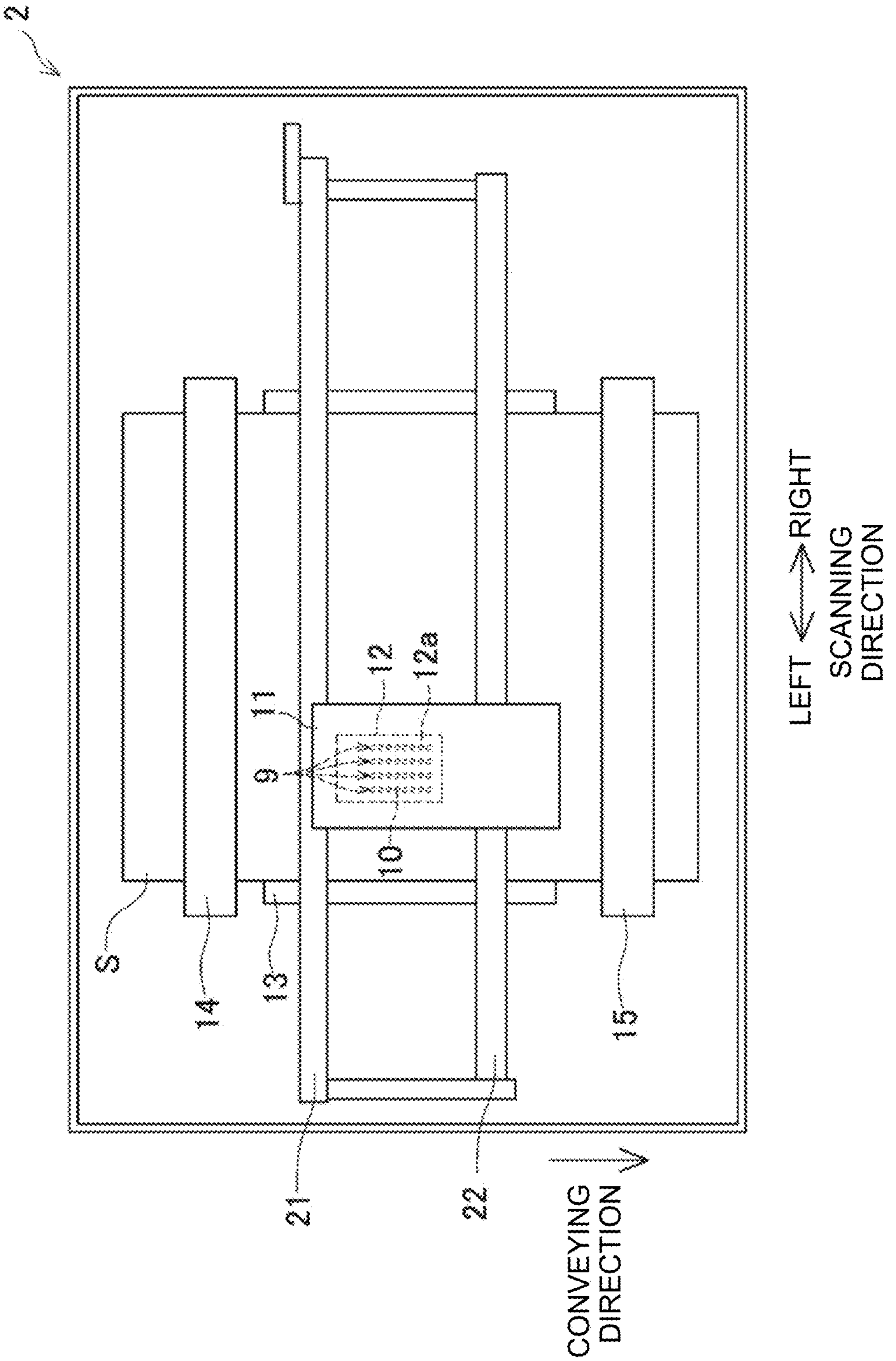
FIG. 2 is a diagram depicting a schematic configuration of a recording part.

A recording apparatus 1 of the present embodiment is capable of preforming recording on a recording sheet S, reading of a document (original document), etc., and is a so-called multifunction peripheral. As depicted in FIG. 1, the recording apparatus 1 according to the present embodiment includes a recording part 2 which is depicted in FIG. 2, a feeding part 3, a discharging part 4, a reading part 5, and an operation panel 6.

The recording part 2 is disposed inside the recording apparatus 1, and is a part which performs a recording of an image onto the recording sheet S. The recording part 2 will be described in detail later. The feeding part 3 feeds the recording sheet S to the recording part 2. The discharging part 4 is a part to which the recording sheet S, having the recording performed thereon by the recording part 2, is discharged. The reading part 5 is a part which performs a reading of the image. The reading part 5 will be described in detail later.

The operation panel 6 is, for example, a touch panel. As will be described later, various selecting parts, each of which is configured to be selected by a user, are displayed on the operation panel 6; in a case where the user touches a part, of the operation panel 6, which displays each of the selecting parts, the user can select the touched selecting part. Note that in the present embodiment, the operation panel 6 is an example of an integrated member of a "display" and an "interface (operating part)". Further, instead of the operation panel 6, a display such as a liquid crystal display and an interface (an operating part) such as a button may be separately included in the recording apparatus 1. In this case, a selecting part which is displayed in the display is selected, based on an operation of the interface by the user.

(Recording Part)

Next, the recording part 2 will be described in detail. As depicted in FIG. 2, the recording part 2 includes a first carriage 11, an ink-jet head 12, a platen 13, and conveying rollers 14 and 15.

The first carriage 11 is supported by two guide rails 21 and 22 which extend in a horizontal scanning direction. In the following description, right and left of the scanning direction are defined as depicted in FIGS. 1 and 2. The first carriage 11 is connected to a first carriage motor 86 depicted in FIG. 5 via a non-depicted belt, etc. In a case where the first carriage motor 86 is driven, the first carriage 11 moves along the guide rails 21 and 22 in the scanning direction.

The ink-jet head 12 is mounted on the first carriage 11. The ink-jet head 12 ejects an ink from a plurality of nozzles 10 formed in a nozzle surface 12*a* which is the lower surface of the ink-jet head 12. To provide a more detailed description, the plurality of nozzles 10 is aligned in a conveying direction which is horizontal and which is orthogonal to the scanning direction so as to form a nozzle row 9. Four nozzle rows 9 are arranged side by side in the scanning direction in the nozzle surface 12*a*. Black, yellow, cyan, and magenta inks are ejected from the plurality of nozzles 10 of the four nozzle rows 9, starting from rightmost nozzle row in the scanning direction.

The platen 13 is disposed below the ink-jet head 12 and faces the plurality of nozzles 10. The platen 13 extends over the entire length of the recording sheet S in the scanning direction and supports the recording sheet S from below. The conveying roller 14 is disposed at a position upstream of the ink-jet head 12 and the platen 13 in the conveying direction. The conveying roller 15 is disposed at a position downstream of the ink-jet head 12 and the platen 13 in the conveying direction. The conveying rollers 14 and 15 are connected to a conveying motor 87 depicted in FIG. 5 via a non-depicted gear, etc. In a case where the conveying motor 87 is driven, the conveying rollers 14 and 15 rotate and the recording sheet S is thereby conveyed in the conveying direction.

Further, in the recording part 2, a recording pass of causing the ink-jet head 12 to eject the ink(s) from the plurality of nozzles 10 toward the recording sheet S while driving the first carriage motor 86 so as to move the first carriage 11 in the scanning direction, and a conveying operation of driving the conveying motor 87 so as to cause the conveying rollers 14 and 15 to convey the recording sheet S in the conveying direction are repeatedly performed, and thereby recording of an image on the recording sheet S fed from the feeding part 3 can be performed. The recording sheet S on which the image has been recorded will be discharged to the discharging part 4.

(Reading Part)

Figure 3:
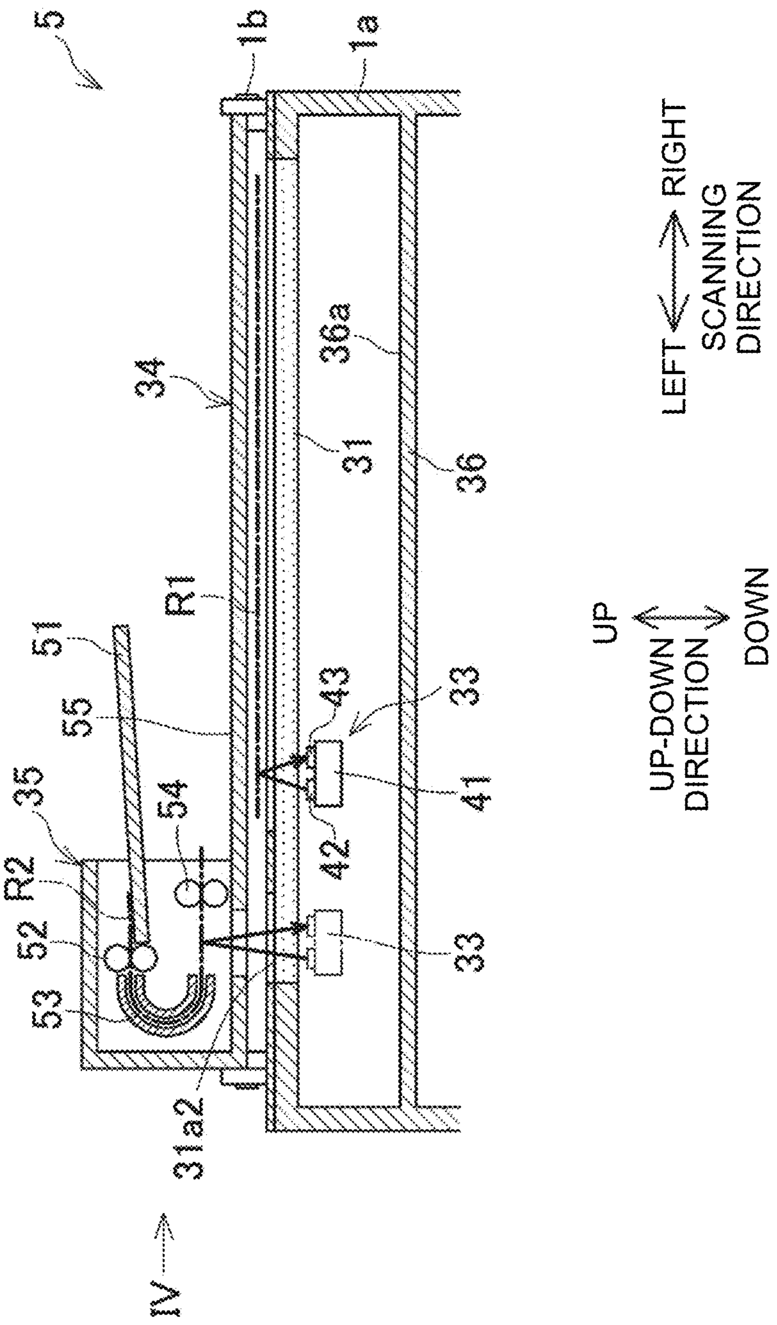
FIG. 3 is a diagram depicting a schematic configuration of a reading part.
Figure 4A:
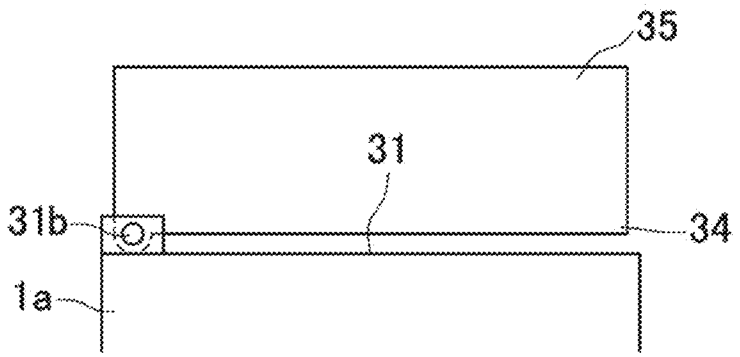
FIG. 4A is a diagram of the recording part depicted in FIG. 3 as seen in the direction of arrow IV.
Figure 4B:
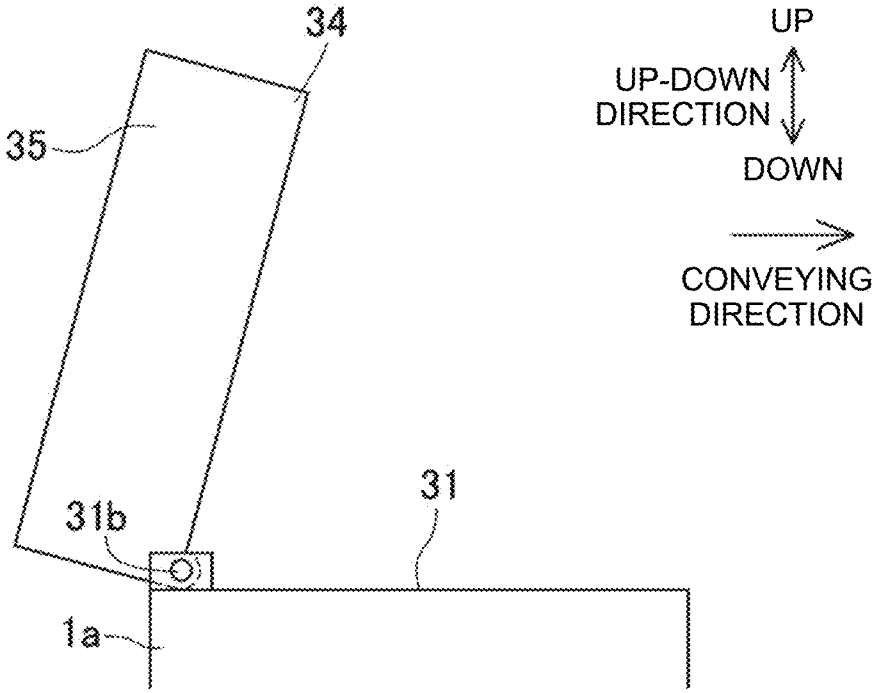
FIG. 4B is a diagram depicting a state that a cover depicted in FIG. 4A is open.

As depicted in FIGS. 3, 4A and 4B, the reading part 5 includes a placement stand 31, a reading unit 33, a cover 34 and an ADF 35.

The placement stand 31 is a transparent member having a substantially rectangular parallelepiped shape and made of a material such as glass, and is disposed in an upper part of the recording apparatus 1.

The reading unit 33 is located below the placement stand 31. The reading unit 33 has a second carriage 41, a light-emitting part 42, and a plurality of light-receiving parts 43.

The second carriage 41 extends over the entire length of the placement stand 31 in the conveying direction. Further, the second carriage 41 is supported by a non-depicted guide rail so as to be movable in the scanning direction. Furthermore, the second carriage 41 is connected to a second carriage motor 88 depicted in FIG. 5 via a non-depicted belt, etc. In a case where the second carriage motor 88 is driven, the second carriage 41 moves in the scanning direction along the non-depicted guide rail.

The light-emitting part 42 is disposed on the upper surface of the second carriage 41. The light-emitting part 42 irradiates lights of three colors which are red, green, and blue, toward the placement stand 31. The plurality of light-receiving parts 43 is disposed on the upper surface of the second carriage 41. The plurality of light-receiving parts 43 is arranged adjacent to each other in the conveying direction over the entire length of the placement stand 31. Each of the plurality of light-receiving parts 43 receives the light which is irradiated from the light-emitting part 42 and reflected by a document (original document) R1 placed on the placement stand 31, or a document (original document) R2 conveyed by the ADF 35 as will be described later. Each of the plurality of light-receiving parts 43 individually detects the red, green, and blue components of the received light, and outputs a signal according to the components of the respective colors.

The cover 34 is positioned above the placement stand 31. The cover 34 is supported to be swingable by a swinging shaft 31*b*. The swinging shaft 31*b* is disposed at an end part, on the upstream-side in the conveying direction, of an upper end part of a casing 1*a* of the recording apparatus 1, and extends in the scanning direction. Further, the cover 34 is movable between a closed position at which the cover 34 covers the placement stand 31 as depicted in FIG. 4A and an open position at which the cover 34 exposes the placement stand 31 as depicted in FIG. 4B, by swinging about the swinging shaft 31*b*.

The ADF 35 is disposed in the cover 34. In a case where the cover 34 is located at the closed position, the ADF 35 is located above a left end part of the placement stand 31. The ADF 35 includes a document set part 51, a supplying roller 52, a guiding route 53, and a discharging roller 54. Note that ADF is an abbreviation for "Automatic Document Feeder".

The document set part 51 is a part in which the document R2 is set. A single document R2 or a plurality of documents R2 stacked in the up-down direction can be set in the document set part 51. The supplying roller 52 is located immediately on the left of the document set part 51. The supplying roller 52 is connected to an ADF motor 89 depicted in FIG. 5 via a non-depicted gear, etc. In a case where the ADF motor 89 is driven, the supplying roller 52 rotates to thereby convey the document R2 set in the document set part 51 to the left in the scanning direction. In a case where the plurality of documents R2 stacked in the up-down direction is set in the document set part 51, a document R2 located the lowermost among the plurality of documents R2 is conveyed by the supplying roller 52.

The guiding route 53 guides the document R2 conveyed by the supplying roller 52. To provide a more detailed description, the guiding route 53 is an arc-shaped path as seen in the conveying direction. The document R2 conveyed to the left in the scanning direction by the supplying roller 52 is guided by the guiding route 53 so that the orientation of conveyance of the document R2 is changed downward, and then the orientation of conveyance of the document R2 is changed to the rightward in the scanning direction. Then, document R2 fed out from the guiding route 53 is conveyed to the right in the scanning direction, at a location immediately above the placement stand 31.

Figure 5:
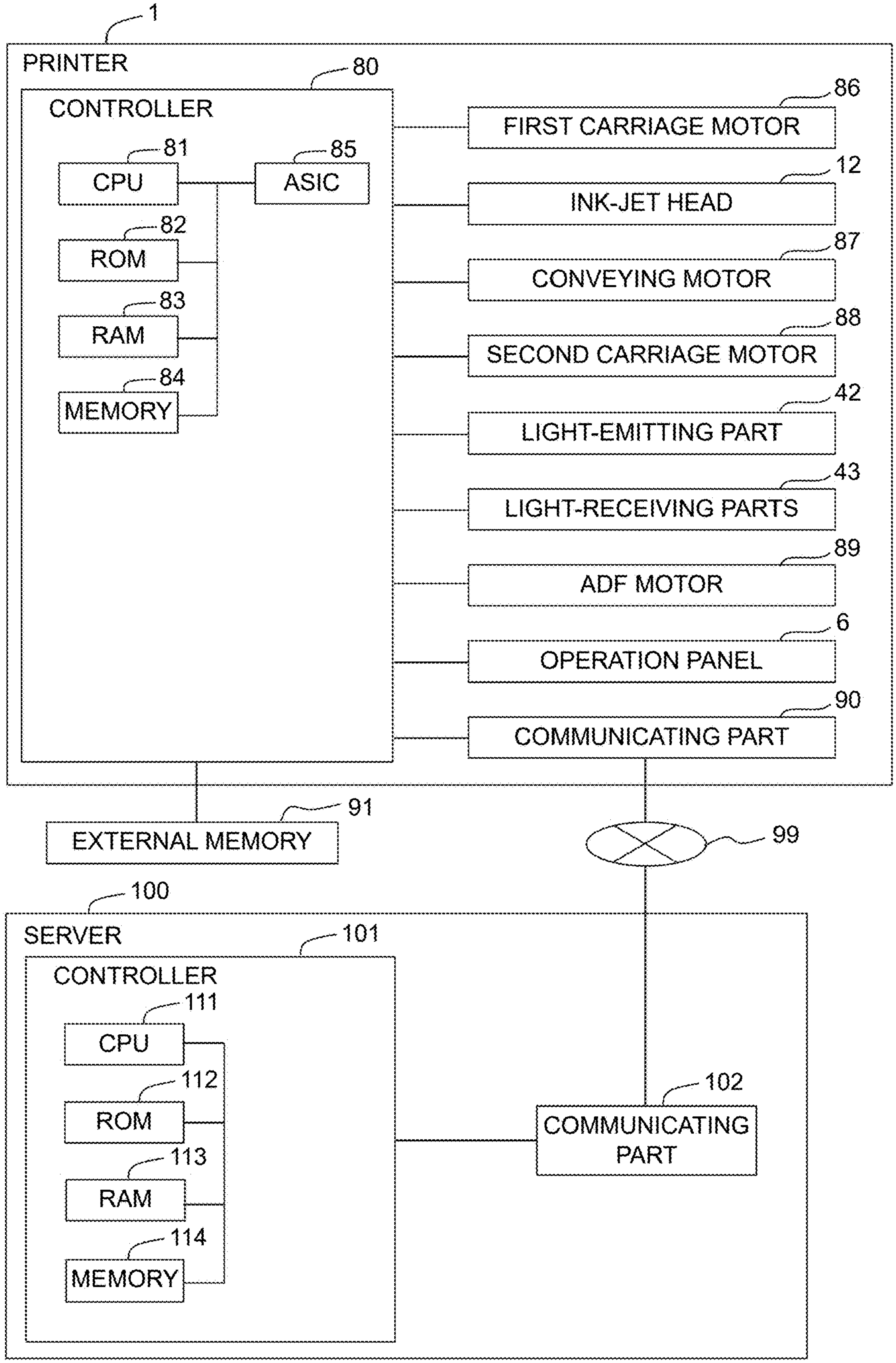
FIG. 5 is a block diagram depicting an electrical configuration of the recording apparatus, etc.

The discharging roller 54 is connected to the ADF motor 89 depicted in FIG. 5 via a non-depicted gear, etc. In a case where the ADF motor 89 is driven, the discharging roller 54 rotates so as to convey the document R2 fed out from the guiding route 53 to the right in the scanning direction and to discharge the document R2 to the discharging part 55 disposed in the upper surface of the cover 34.

Further, in the recording apparatus 1, in a state that the document R1 is placed on the placement stand 31, the reading unit 33 is caused to irradiate the lights from the light-emitting part 42 towards the placement stand 31, while the second carriage motor 88 is controlled to thereby cause the second carriage 41 to move in the scanning direction, as depicted by solid lines in FIG. 3. With this, the document R1 placed on the placement stand 31 can be read by the reading unit 5.

Furthermore, in the recording apparatus 1, in a state that the reading unit 33 is positioned immediately below the ADF 35 as depicted by dashed lines in FIG. 3 and that the document R2 is set in the document set part 51, the reading unit 33 is caused to irradiate the lights from the light-emitting part 42 toward the placement stand 31, while the ADF motor 89 is controlled to convey the document R2 by the supplying roller 52 and the discharging roller 54. With this, the document R2 which is being conveyed immediately above the placement stand 31 can be read by the reading unit 5.

Moreover, the reading part 5, which reads the document as described above, is capable of performing a single-sided reading of reading one surface of the document, whereas the reading part 5 is not capable of performing a double-sided reading of reading the both surfaces of the document at a time.

Further, a partition wall 36 overlapping with the placement stand 31 in the up-down direction is disposed below the reading unit 33. The partition wall 36 is configured to separate a space in the recording apparatus 1 in which the reading unit 33 is disposed from another space in the recording apparatus 1 in which the ink-jet head 12 and the like are disposed.

(Electric Configuration of Recording Apparatus)

Next, the electrical configuration of the recording apparatus 1 will be described. As depicted in FIG. 5, the recording apparatus 1 includes a controller 80. The controller 80 includes a CPU 81, a ROM 82, a RAM 83, a memory 84, an ASIC 85, and the like. Note that in the present embodiment, the controller 80 is an example of a "controller".

The controller 80 controls the operation of each of the feeding part 3, the first carriage motor 86, the ink-jet head 12, the conveying motor 87, the second carriage motor 88, the light-emitting part 42, the ADF motor 89, the operation panel 6, etc. Further, the controller 80 receives a signal from each of the operation panel 6 and the plurality of light-receiving parts 43. Furthermore, in the present embodiment, an external memory 91 is detachably attached to the recording apparatus 1. Note that in the present embodiment, the external memory 91 is an example of a "memory".

Moreover, in the present embodiment, the recording apparatus 1 includes a communicating part 90. The communicating part 90 is connectable to a communicating part 102 of a server 100, which will be described later, via a network 99 such as the Internet. The server 100 includes a controller 101, the communicating part 102, and the like. The controller 101 includes a CPU 111, a ROM 112, a RAM 113, a memory 114, and the like, and performs a process related to an additional function which will be described later. The communicating part 102 will be connected to the communicating part 90 of the recording apparatus 1 via the network 99. Further, the recording apparatus 1 and the server 100 are connected by connecting the communicating part 90 of the recording apparatus 1 and the communicating part 102 of the server 100 with each other, and a signal can be transmitted and received between the recording apparatus 1 and the server 100. Note that in the present embodiment, the server 100 is an example of an "external apparatus". Further, the controller 101 is an example of a "controller". Furthermore, the memory 114 is an example of a "memory".

Note that in the controller 80 of the recording apparatus 1, only the CPU 81 may perform various processes or only the ASIC 85 may perform the various processes, or the CPU 81 and the ASIC 85 may perform the various processes in a cooperative manner. In the controller 80, one CPU 81 may singly perform a process, or a plurality of CPUs 81 may perform the process in a sharing manner. In the controller 80, one ASIC 85 may singly perform a process, or a plurality of ASICs 85 may perform the process in a sharing manner. In the controller 101 of the server 100, one CPU 111 may singly perform a process, or a plurality of CPUs 111 may perform the process in a sharing manner.

(Main Screen)

Figure 6A:
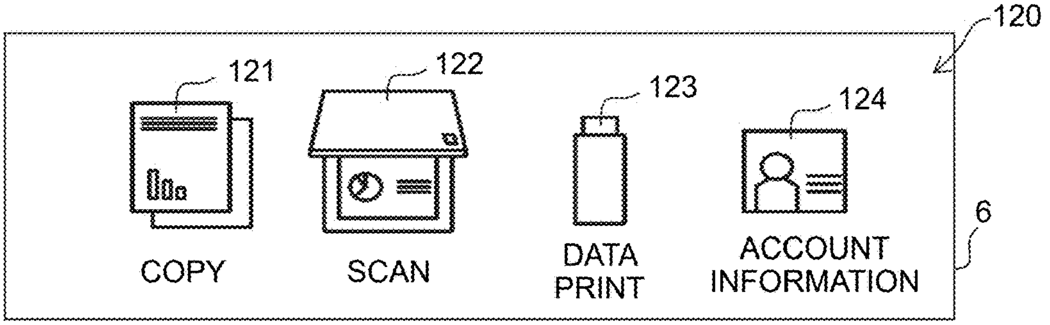
FIG. 6A is a diagram for illustrating a main screen.

In a case where the recording apparatus 1 is in a standby state wherein the recording apparatus 1 is not performing recording on the recording sheet S, reading of the document by the reading part 5, etc., the controller 80 causes the display panel 6 to display a main screen 120 depicted in FIG. 6A. The main screen 120 has a copy selecting part 121, a scan selecting part 122, a data print selecting part 123, and an account information selecting part 124. Note that in a case where each of the selecting parts is displayed on the operation panel 6, each of the selecting parts is displayed in a selectable state, unless otherwise described specifically. Further, in the present embodiment, the main screen 120 is an example of a "first screen". Furthermore, each of the scan selecting part 122 and the data print selecting part 123 is an example of a "first selecting part".

The copy selecting part 121 is a part which is selected by the user for causing the recording apparatus 1 to perform copying. The term "copying" means performing, in the recording part 2, a recording of an image corresponding to the document read in the reading part 5. Note that, however, the detailed description of the operation, etc., in a case where the copy selecting part 121 is selected is omitted.

The scan selecting part 122 is a part selected by the user for causing the recording apparatus 1 to perform the reading of the document by the reading part 5. The operation etc., in a case where the scan selecting part 122 is selected will be described in detail later.

The data print selecting part 123 is a part selected by the user for causing the recording apparatus 1 to perform data printing. The term "data printing" means, for example, performing, in the recording part 2, a recording of an image corresponding to image data stored in the external memory 91, etc. The operation etc., in a case where the data print selecting part 123 is selected will be described in detail later.

The account information selecting part 124 is a part selected by the user for causing the recording apparatus 1 to perform registration of an account and reference of an account. In the present embodiment, in a case where the recording apparatus 1 is connected to the server 100, where the recording apparatus 1 has completed the receiving of information from the server 100 regarding the additional function which will be described later, and where the account registration has been made, the additional function which will be described later can be executed. The operation etc., in a case where the account information selecting part 124 is selected will be described in detail later.

(Operation in a Case where the Scan Selecting Part is Selected)

Next, the operation in a case where the scan selecting part 122 is selected in the main screen 120 will be described.

In a case where the scan selecting part 122 is selected in a state that the recording apparatus 1 is not connected to the server 100, or in a state that the recording apparatus 1 is connected to the server 100 and the recording apparatus 1 has not yet completed the receiving of the information regarding the additional function, which will be described later, from the server 100, the controller 80 causes the operation panel 6 to display a scan setting screen 130A depicted in FIG. 6B. Note that in the present embodiment, a condition that the receiving of the information regarding the additional function, which will be described later, from the server 100 has been completed is an example of a "display permitting condition".

The scan setting screen 130A has a plurality of basic scan setting selecting parts 131 and a scan start selecting part 132. Each of the plurality of basic scan setting selecting parts 131 is a part selected by the user for selecting a setting item for a single-sided read data generating function (to be described later), which is a basic function which can be executed before and after the recording apparatus 1 has been connected to the server 100, among functions related to the reading of document by the reading part 5. Note that at least one of these setting items may be a setting item common to a setting item for a double-sided read data generating function (to be described later).

Figure 6B:
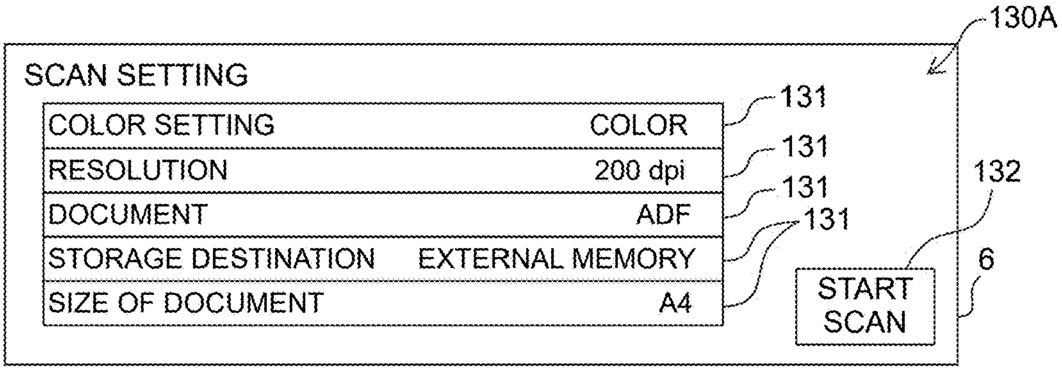
FIG. 6B is a diagram for illustrating a scan setting screen in a case where the recording apparatus is not connected to a server.

As depicted in FIG. 6B, the plurality of basic scan setting selecting parts 131 may include, for example, a basic scan setting selecting part 131 for setting whether to read the document as a color image or a monochromatic image. The plurality of basic scan setting selecting parts 131 may also include, for example, a basic scan setting selecting part 131 for setting the resolution of the reading of the document. The plurality of basic scan setting selecting parts 131 may also include, for example, a basic scan setting selecting part 131 for setting whether to read the document R1 placed on the document stand 31 or the document R2 conveyed by the ADF 35. The plurality of basic scan setting selecting parts 131 may also include, for example, a basic scan setting selecting part 131 for setting the storage destination for storing the read data of the document. The plurality of basic scan setting selecting parts 131 may also include, for example, a basic scan setting selecting part 131 for setting the size of the document to be read. Any detailed description of the operation in a case where each of the basic scan setting selecting parts 131 is selected will be omitted.

The scan start selecting part 132 is a part selected by the user for starting the reading of the document by the reading part 5. The operation in a case where the scan start selecting part 132 is selected will be described in detail later.

Figure 6C:
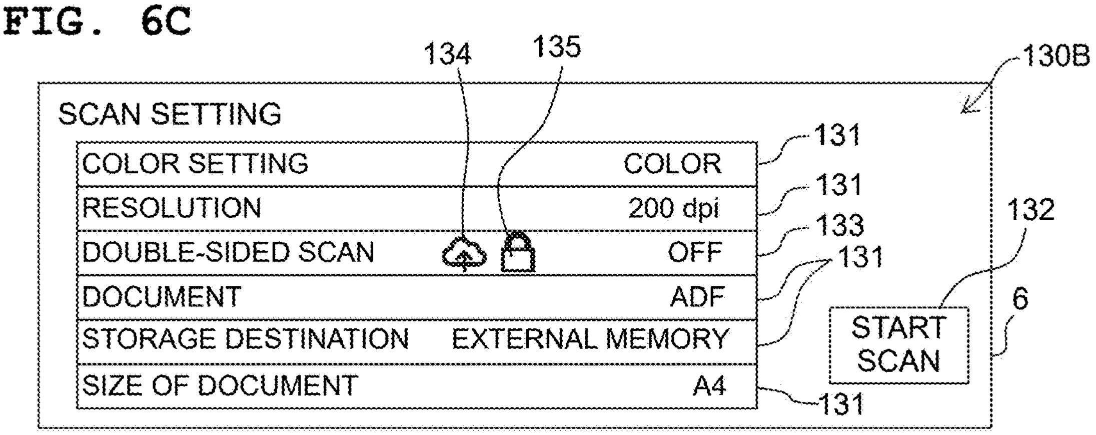
FIG. 6C is a diagram for illustrating the scan setting screen in a case where the recording apparatus is connected to the server and an account registration has not been made.

In a case where the scan selecting part 122 is selected in a state that the recording apparatus 1 is connected to the server 100, that the recording apparatus 1 has completed the receiving of the information regarding the additional function from the server 100, and that the account registration has not been made, the controller 80 causes the operation panel 6 to display a scan setting screen 130B depicted in FIG. 6C. The scan setting screen 130B has a double-sided scan setting-selecting part 133, in addition to a plurality of basic scan setting selecting parts 131 and a scan start selecting part 132 which are same as or similar to the plurality of basic scan setting selecting parts 131 and the scan start selecting part 132 of the scan setting screen 130A of FIG. 6B.

The double-sided scan setting-selecting part 133 is a part selected by the user for performing setting regarding a double-sided read data generating function as the additional function to be described later. Here, the double-sided scan setting-selecting part 133 includes a cloud icon 134 which indicates that the double-sided scan setting-selecting part 133 relates to the additional function. Note that in the present embodiment, the cloud icon 134 is an example of a "first icon". Each of the other cloud icons in the following description is similarly an example of the "first icon".

Note, however, that in the scan setting screen 130B, the double-sided scan setting-selecting part 133 is displayed on the operation panel 6 in a state that the double-sided scan setting-selecting part 133 is not selectable, namely, in a non-selectable state. Here, in the scan setting screen 130B, the double-sided scan setting-selecting part 133 includes a lock icon 135. Further, the lock icon 135 indicates that the double-sided scan setting-selecting part 133 is not selectable, and that the double-sided read data generating function cannot be executed. Note that in the present embodiment, the lock icon 135 is an example of a "second icon". Each of the other lock icons in the following description is similarly an example of the "second icon".

Figure 6D:
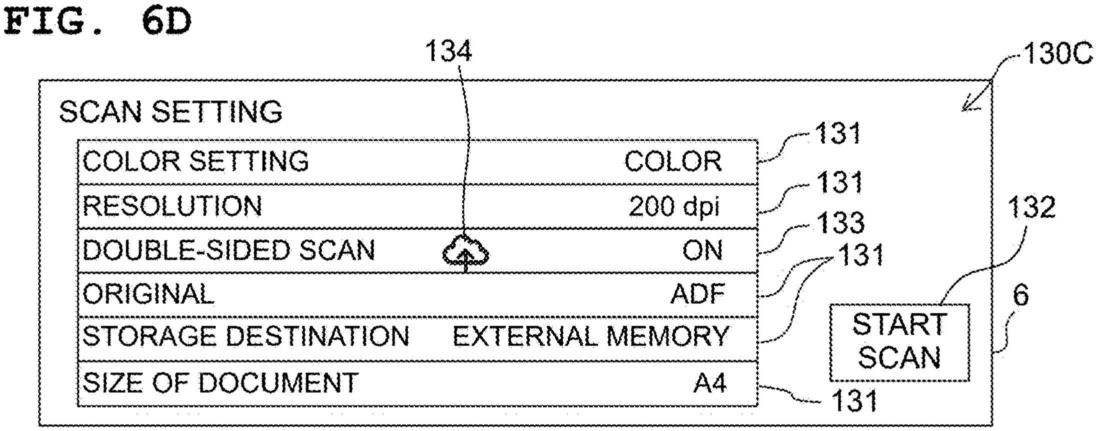
FIG. 6D is a diagram for illustrating the scan setting screen in a case where the recording apparatus is connected to the server and the account registration has been made.

In a case where the scan selecting part 122 is selected in a state that the recording apparatus 1 is connected to the server 100, that the recording apparatus 1 has completed the receiving of the information regarding the additional function from the server 100 and that the account registration has been made, the controller 80 causes the operation panel 6 to display a scan setting screen 130C depicted in FIG. 6D. The scan setting screen 130C has a plurality of basic scan setting selecting parts 131, a scan start selecting part 132, and a double-sided scan setting-selecting part 133, same as or similarly to the scan setting screen 130C in FIG. 6C.

Note, however, that in the scan setting screen 130C, the double-sided scan setting-selecting part 133 is displayed on the operation panel 6 in a state that the double-sided scan setting-selecting part 133 is selectable, namely, in a selectable state. Here, in the scan setting screen 130C, the double-sided scan setting-selecting part 133 does not include the lock icon 135, and the lock icon 135 being not included indicates that the double-sided scan setting-selecting part 133 is selectable.

Figure 7A:
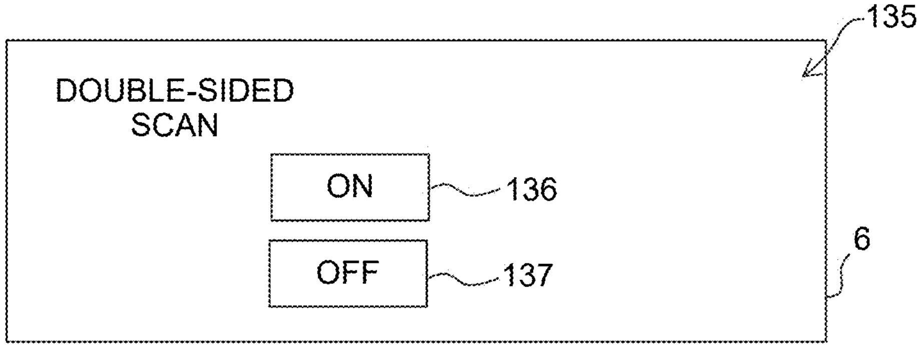
FIG. 7A is a diagram for illustrating a double-sided scan setting screen.

In a case where the user selects the double-sided scan setting-selecting part 133 in the scan setting screen 130C, the controller 80 causes the operation panel 6 to display a double-sided scan selecting screen 135 as depicted in FIG. 7A. The double-sided scan selecting screen 135 has an ON selecting part 136 and an OFF selecting part 137.

The ON selecting part 136 is a part selected by the user for turning on the double-sided read data generating function. In a case where the ON selecting part 136 is selected, the controller 80 returns the screen displayed on the operation panel 6 to the scan setting screen 130C in such a manner that the double-sided scan setting-selecting part 133 in the scan setting screen 130C indicates that the double-sided read data generating function is ON. For example, the controller 80 causes the double-sided scan setting-selecting part 133 to display "ON" as depicted in FIG. 6D. Further, in a case where the double-sided scan setting-selecting part 133 is selected in the scan setting screen 130C and further the ON selecting part 136 is selected in the double-sided scan selecting screen 135, the controller 80 causes the memory 84 to store information indicating that the double-sided read data generating function is ON. Further, in this situation, the controller 80 transmits a first ON signal indicating that the double-sided read data generating function is ON to the server 100. In the present embodiment, the first ON signal is an example of a "first selection signal".

The OFF selecting part 137 is a part selected by the user for turning off the double-sided read data generating function. In a case where the double-sided scan setting-selecting part 133 is selected in the scan setting screen 130C and further the OFF selecting part 137 is selected in the double-sided scan selecting screen 135, the controller 80 returns the screen displayed on the operation panel 6 to the scan setting screen 130C in such a manner that the double-sided scan setting-selecting part 133 in the scan setting screen 130C indicates that the double-sided read data generating function is OFF. For example, the controller 80 causes the double-sided scan setting-selecting part 133 to display "OFF" as depicted in FIG. 6C. In this situation, the controller 80 causes the memory 84 to store information indicating that the double-sided read data generating function is OFF. Further, in this situation, the controller 80 transmits a first OFF signal indicating that the double-sided read data generating function is OFF to the server 100. Note that in the present embodiment, the first OFF signal is an example of a "second selection signal".

Figure 7B:
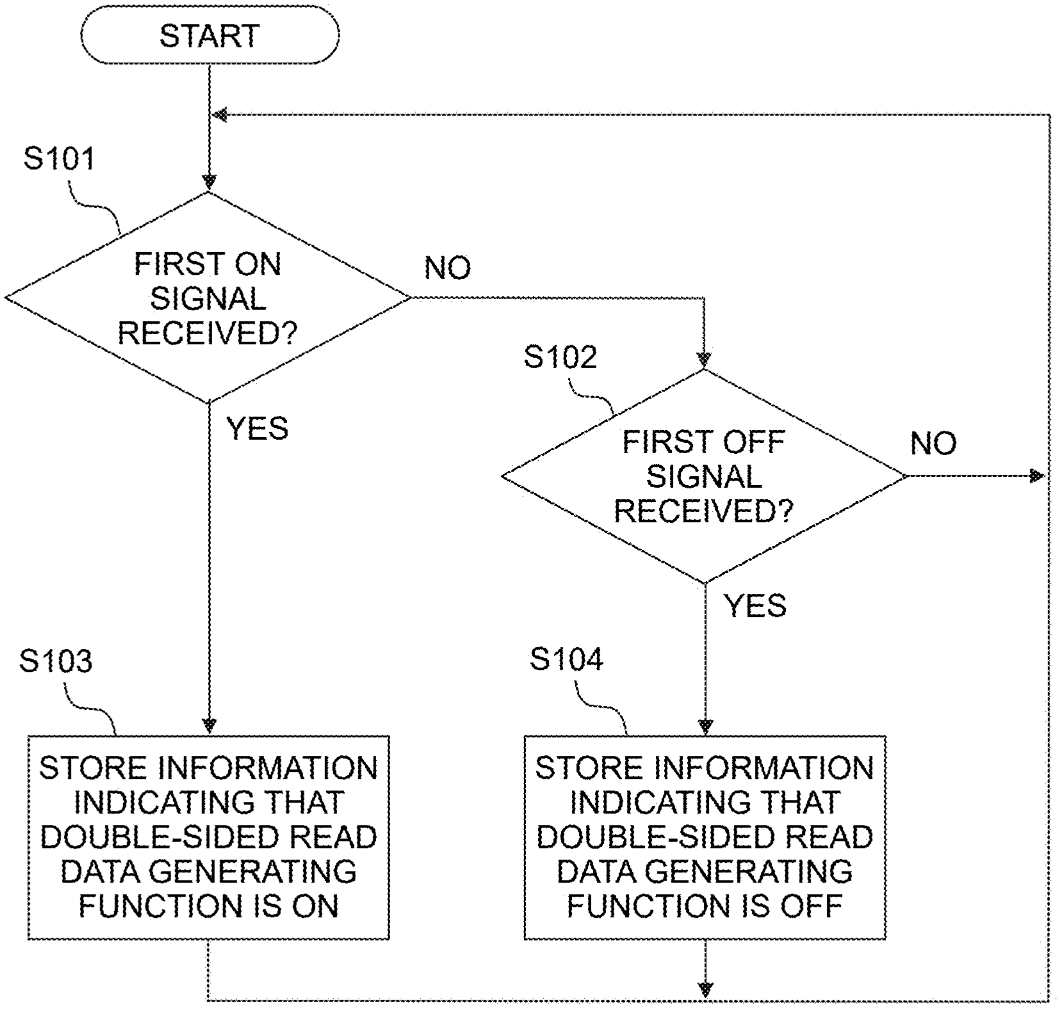
FIG. 7B is a flowchart depicting a flow of a process, in a controller of the server, corresponding to selection by a user in the double-sided scan setting screen.

In relation to the transmission of the first ON signal and the first OFF signal from the controller 80 of the recording apparatus 1, the controller 101 of the server 100 performs a process according to the flowchart of FIG. 7B during operation. To provide a more detailed description, the controller 101 stands by while the controller 101 receives neither the first ON signal nor the first OFF signal (step S101: NO, step S102: NO). In a case where the controller 101 receives the first ON signal (step S101: YES), the controller 101 causes the memory 114 to store the information indicating that the double-sided read data generating function is ON (step S103), and the controller 101 returns the process to step S101. In a case where the controller 101 receives the first OFF signal (step S101: NO, step S102: YES), the controller 101 causes the memory 114 to store the information indicating that the double-sided read data generating function is OFF (S104), and the controller 101 returns the process to step S101.

Note that in the present embodiment, each of the scan setting screens 130A to 130C is an example of a "second screen", corresponding to the scan selecting part 122. Further, each of the plurality of basic scan setting selecting parts 131 is an example of a "second selecting part", corresponding to the scan selecting part 122. Furthermore, the double-sided scan setting-selecting part 133 is an example of a "third selecting part", corresponding to the scan selecting part 122.

(Operation in a Case where the Scan Start Selecting Part is Selected)

Next, the operation in a case where the scan start selecting part 132 is selected will be described. Note that the following description will be made using a case where the document R2 which is being conveyed by the ADF 32 is read in the reading part 5, as an example.

Figure 8A:
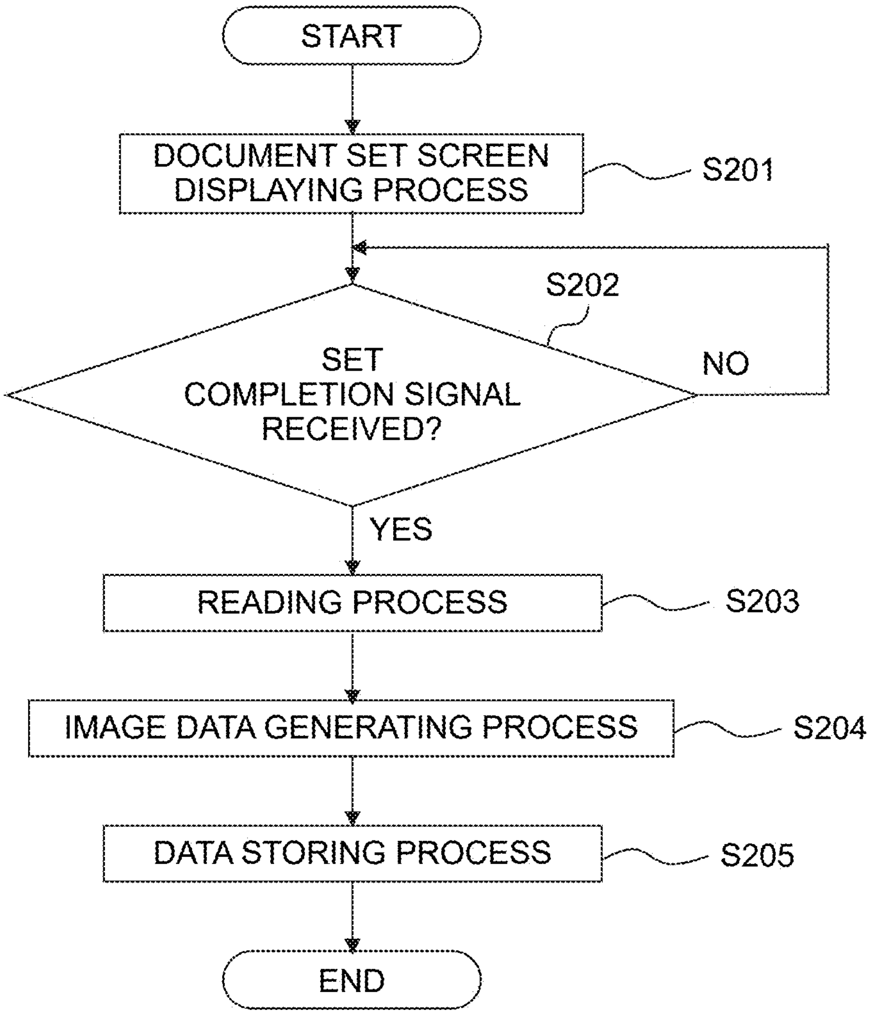
FIG. 8A is a flowchart depicting a flow of a process in a controller of the recording apparatus for executing a single-sided read data generating function.

In a case where the scan start selecting part 132 is selected in the scan setting screen 130A or 130B, or in a case where the scan start selecting part 132 is selected in the scan setting screen 130C in a state that the information indicating that the double-sided read data generating function is OFF is stored in the memory 84, the controller 80 performs a process in accordance with the flowchart of FIG. 8A.

Figure 8B:
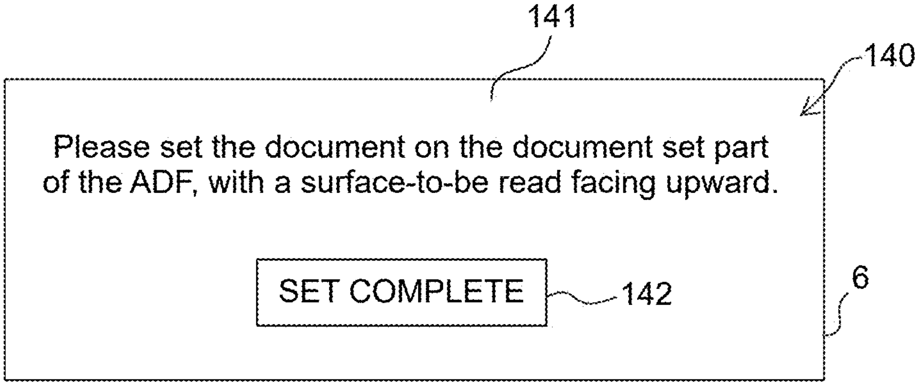
FIG. 8B is a diagram for illustrating a document set screen.

To provide a more detailed description, the controller 80 executes a document set screen displaying process (step S201). In the document set screen displaying process, the controller 80 causes the operation panel 6 to display a document set screen 140 as depicted in FIG. 8B. The document set screen 140 has a message part 141 and a set completion selecting part 142. The message part 141 displays a message prompting the user to set the document R2 in the document set part 51 of the ADF 35 in a state that a surface-to-be-read of the document R2 faces upward. The set completion selecting part 142 is a part selected by the user in a case where the setting of the document R2 in the document set part 51 is completed. In a case where the set completion selecting part 142 is selected, a set completion signal is transmitted from the operation panel 6 to the controller 80.

After the document set screen displaying process in step S201, the controller 80 stands by until the controller 80 receives the set completion signal (step S202: NO). In a case where the controller 80 receives the set completion signal (step S202: YES), the controller 80 executes a reading process (step S203). In the reading process, the controller 80 causes the ADF 35 to convey a plurality of documents R2 set in the document set part 51 one by one as described above, and causes the reading unit 33 to read each of the documents R2 which are conveyed, thereby generating read data of one surface of each of the documents R2.

Next, the controller 80 executes an image data generating process (step S204). In the image data generating process, the controller 80 generates image data of the read image based on the read data generated in the reading process. Next, the controller 80 executes a data storing process (step S205), and terminates the process. In the data storing process, the controller 80 stores the image data generated in the image data generating process in a target storage set in the scan setting screen 130A, 130B, or 130C, such as the external memory 91, etc. Note that, in this situation, the controller 80 may store the image data of a specific data format. Alternatively, the recording apparatus 1 may be configured such that the data format of the image data to be stored can be selected in the scan setting screens 130A to 130C, and the controller 80 may store the image data of a selected data format.

Figure 9:
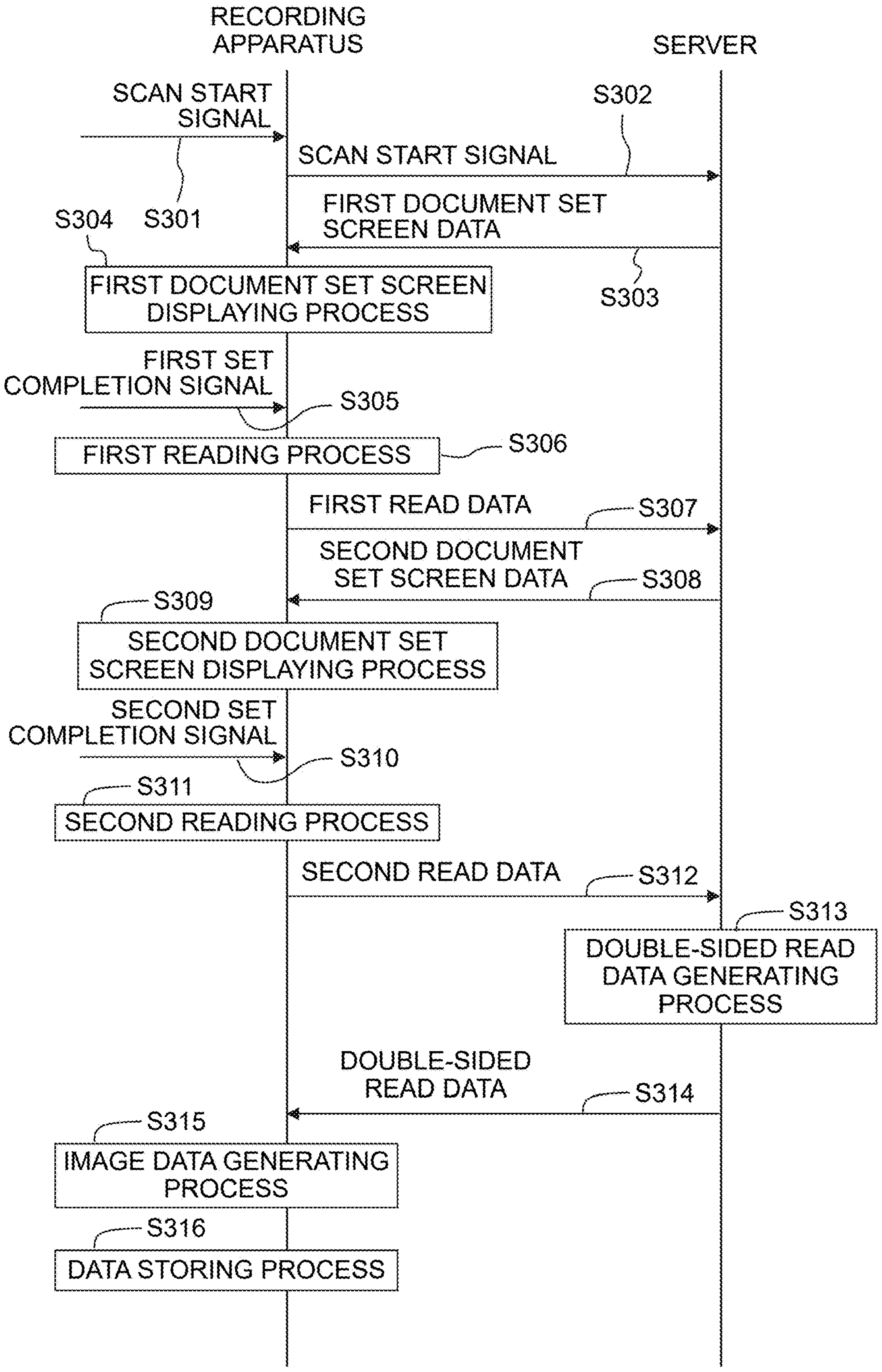
FIG. 9 is a sequence diagram depicting a flow of a process, in the controller of the recording apparatus and the controller of the server, for executing a double-sided read data generating function.

In a case where the scan start selecting part 132 is selected in the scan setting screen 130C in a state that the information indicating that the double-sided read data generating function is ON is stored in the memory 84, the controller 80 of the recording apparatus 1 and the controller 101 of the server 100 perform a process in accordance with the sequence diagram of FIG. 9.

To provide a more detailed description, in a case where the scan start selecting part 132 is selected in the scan setting screen 130C in a state that the information indicating that the double-sided read data generating function is ON is stored in the memory 84, a scan start signal is transmitted from the operation panel 6 to the controller 80 of the recording apparatus 1 (step S301). In a case where the controller 80 receives the scan start signal from the operation panel 6, the controller 80 transmits a scan start signal to the server 100 (step S302). Note that in the present embodiment, the scan start signal transmitted from the recording apparatus 1 to the server 100 in the step S302 is an example of a "control instruction signal" which corresponds to the double-sided read data generating function.

Figure 10A:
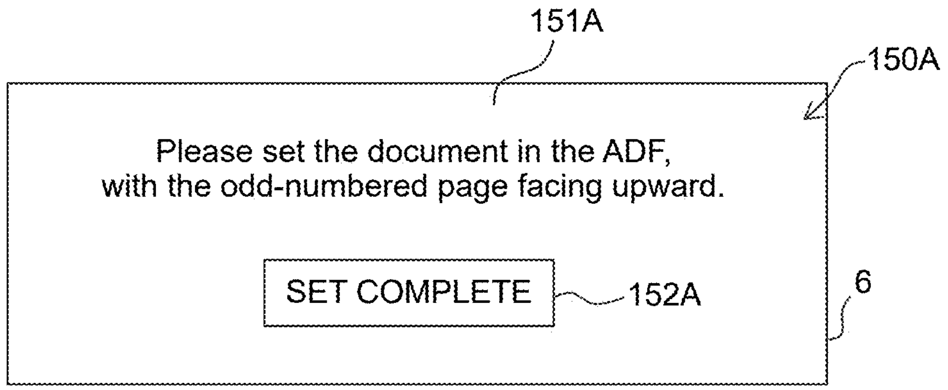
FIG. 10A is a diagram for illustrating a first document set screen.

In a case where the controller 101 of the server 100 receives the scan start signal, the controller 101 transmits first document set screen data to the controller 80 of the recording apparatus 1 (step S303). In a case where the controller 80 of the recording apparatus 1 receives the first document set screen data, the controller 80 executes a first document set screen displaying process (step S304). In the first document set screen displaying process, the controller 80 of the recording apparatus 1 causes the operation panel 6 to display a first document set screen 150A as depicted in FIG. 10A, based on the received first document set screen data.

The document set screen 150A has a message part 151A and a set completion selecting part 152A. The message part 151A displays a message prompting the user to set the document R2 in the document set part 51 of the ADF 35 in a state that a surface of odd-numbered page of the document R2 faces upward. The set completion selecting part 152A is a part selected by the user in a case where the setting of the document R2 in the document set part 51 is completed. In a case where the set completion selecting part 152A is selected, a first set completion signal is transmitted from the operation panel 6 to the controller 80 (step S305).

In a case where the controller 80 of the recording apparatus 1 receives the first set completion signal, the controller 80 executes a first reading process (step S306). In the first reading process, the controller 80 of the recording apparatus 1 causes the ADF 35 to convey the plurality of documents R2 set in the document set part 51 one by one, and causes the reading unit 33 to read each of the conveyed documents R2, thereby generating first read data which is read data of one surface of each of the documents R2, as described above. By doing so, the first read data corresponding to the result of the reading of the odd-numbered pages of the documents R2 is generated. The controller 80 of the recording apparatus 1 then transmits the generated first read data to the server 100 (step S307).

Figure 10B:
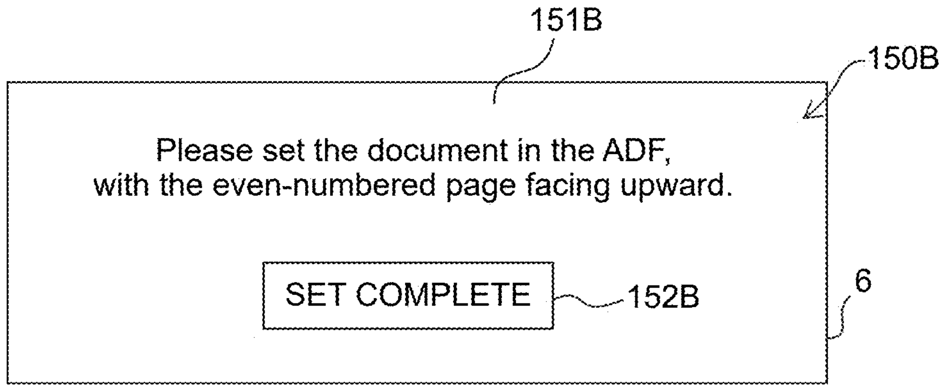
FIG. 10B is a diagram for illustrating a second document set screen.

In a case where the controller 101 of the server 100 receives the first read data, the controller 101 transmits the second document set screen data to the controller 80 of the recording apparatus 1 (step S308). In a case where the controller 80 of the recording apparatus 1 receives the second document set screen data, the controller 80 executes a second document set screen displaying process (step S309). In the second document set screen displaying process, the controller 80 of the recording apparatus 1 causes the operation panel 6 to display a second document set screen 150B as depicted in FIG. 10B, based on the received second document set screen data.

The document set screen 150B has a message part 151B and a set completion selecting part 152B. The message part 151B displays a message prompting the user to set the document R2 in the document set part 51 of the ADF 35 in a state that a surface of even numbered page of the document R2 faces upward. The set completion selecting part 152B is a part selected by the user in a case where the setting of the document R2 in the document set part 51 is completed. In a case where the set completion selecting part 152B is selected, a second set completion signal is transmitted from the operation panel 6 to the controller 80 (step S310).

In a case where the controller 80 of the recording apparatus 1 receives the second set completion signal, the controller 80 executes a second reading process (step S311). In the second reading process, the controller 80 of the recording apparatus 1 causes the ADF 35 to convey the documents R2 set in the document set part 51 one by one, and causes the reading unit 33 to read the conveyed documents R2, thereby generating second read data which is read data of the other surface of each of the document R2, as described above. By doing so, the second read data corresponding to the result of the reading of the even-numbered pages of the documents R2 is generated. The controller 80 of the recording apparatus 1 then transmits the generated second read data to the server 100 (step S312).

In a case where the controller 101 of the server 100 receives the second read data, the controller 101 executes a double-sided read data generating process (step S313). In the double-sided read data generating process, the controller 101 of the server 100 generates double-sided read data, which is read data of the both surfaces of the documents R2, based on the first read data and the second read data which have been received. Then, the controller 101 of the server 100 transmits the generated double-sided read data to the recording apparatus 1 (step S314). In a case where the controller 80 of the recording apparatus 1 receives the double-sided read data, the controller 80 executes an image data generating process (step S315). In the image data generating process, the controller 80 of the recording apparatus 1 generates image data based on the received double-sided read data. Next, the controller 80 of the recording apparatus 1 executes a data storing process so as to store the image data in a target storage set in the scan setting screen 130A, 130B, or 130C, such as for example the external memory 91 (step S316). In this case, same as or similarly to the foregoing description, image data of a specific data format may be stored, or image data of a data format selected in the scan setting screen 130A, 130B or 130C may be stored. Note that, in this example, the server 100 transmits the double-sided read data to the recording apparatus 1, and that the controller 80 of the recording apparatus 1 generates the image data from the double-sided read data. However, the controller 101 of the server 100 may be configured to generate the image data and transmit the image data to the recording apparatus 1.

Here, in the present embodiment, the single-sided read data generating function of generating the image data of the one surface of the document based on the read data of the one surface of the document read in the reading part 5 is an example of a "basic function". Further, the double-sided read data generating function of transmitting, to the server 100, the read data of the one surface of the document and the read data of the other surface of the document read in the reading part 5 and of receiving the image data or the read data of the both surfaces of the document generated in the controller 101 of server 100 based on the read data of the one surface of the document and the read data of the other surface of the document read in the reading part 5 is an example of an "additional function".

(Operation in a Case where the Data Print Selecting Part is Selected)

Next, the operation in a case where the data print selecting part 123 is selected in the main screen 120 will be described. In a case where the data print selecting part 123 is selected, the controller 80 causes the operation panel 6 to display a data print selecting screen 160 depicted in FIG. 11A.

The data print selecting screen 160 has a plurality of data print setting selecting parts 161 and a recording start selecting part 162. Each of the plurality of data print setting selecting parts 161 is a part selected by the user for selecting a setting item of the data print.

Figure 11A:
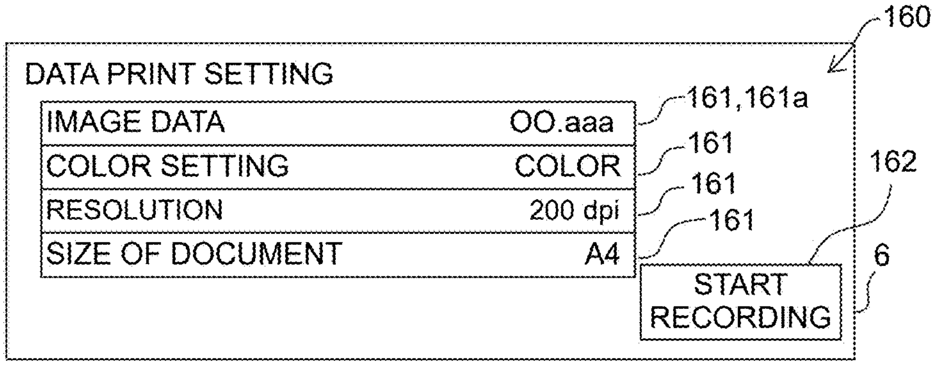
FIG. 11A is a diagram for illustrating a data print setting screen.

As depicted in FIG. 11A, the plurality of data print setting selecting parts 161 includes an image data selecting part 161*a* for selecting image data of an image to be recorded. The plurality of data print setting selecting parts 161 may also include a data print setting selecting part 161 for setting, for example, whether to record the image as a color image or a monochromatic image. The plurality of data print setting selecting parts 161 may also include a data print setting selecting part 161 for setting, for example, the recording resolution. The plurality of data print setting selecting parts 161 may also include a data print setting selecting part 161 for setting, for example, the size of a recording sheet S on which the image is to be recorded. Any detailed description of the operation in a case where a data print setting selecting part 161 other than the image data selecting part 161*a* is selected will be omitted.

The recording start selecting part 162 is a part selected by the user for starting the data print. The operation in a case where the recording start selecting part 162 is selected will be described in detail later.

Figure 11B:
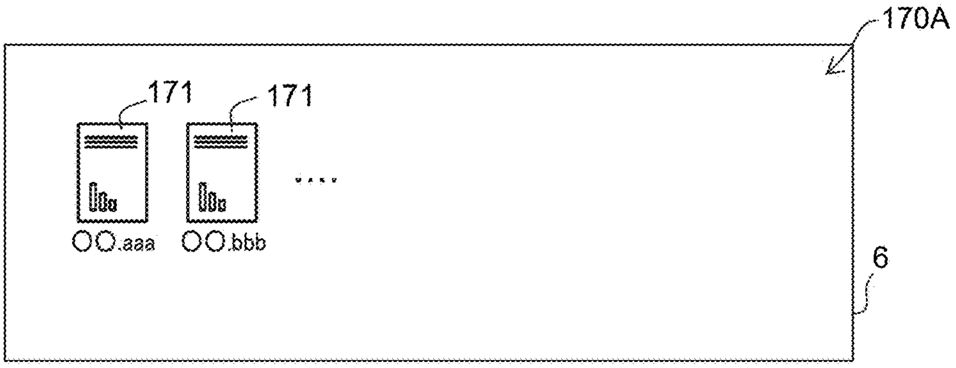
FIG. 11B is a diagram for illustrating an image data selecting screen in a case where the recording apparatus is not connected to the server.

In a case where the image data selecting part 161*a* is selected in a state that the recording apparatus 1 is not connected to the server 100, or in a state that the recording apparatus 1 is connected to the server 100 and the recording apparatus 1 has not yet completed the receiving of the information regarding the additional function from the server 100, the controller 80 causes the operation panel 6 to display an image data selecting screen 170A depicted in FIG. 11B. The image data selecting screen 170A has a first image data selecting part 171. The first image data selecting part 171 is, for example, a part selected by the user for selecting, from the image data stored in the external memory 91, etc., image data of a first data format with which the controller 80 of the recording apparatus 1 can generate ejection data for ejecting ink from the plurality of nozzles 10. In FIG. 11B, for example, image data with an extension "aaa" and image data with an extension "bbb" are each the image data of the first data format.

Figure 11C:
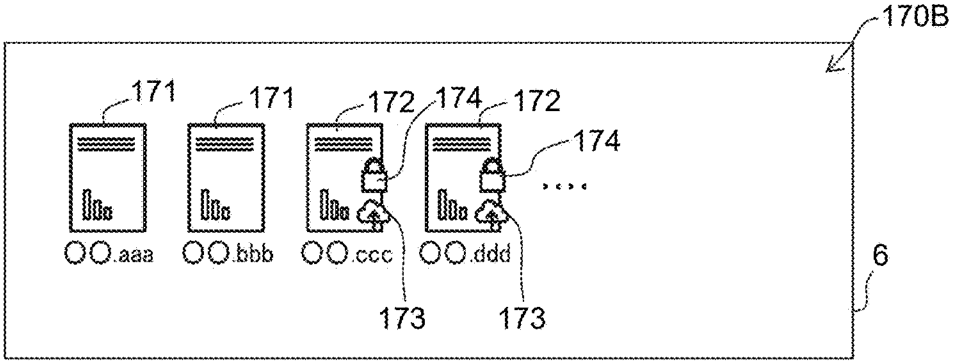
FIG. 11C is a diagram for illustrating the image data selecting screen in a case where the recording apparatus is connected to the server and the account registration has not been made.

In a case where the image data selecting part 161*a* is selected in a state that the recording apparatus 1 is connected to the server 100, that the recording apparatus 1 has completed the receiving of the information regarding the additional function from the server 100 and that the account registration has not been made, the controller 80 causes the operation panel 6 to display an image data selecting screen 170B depicted in FIG. 11C on the operation panel 6. The image data selecting screen 170B has a second image data selecting part 172, in addition to a first image data selecting part 171 same as or similar to the first image data selecting part 171 of the image data selecting screen 170A in FIG. 11B. The second image data selecting part 172 is, for example, a part selected by the user for selecting, from the image data stored in the external memory 91, etc., image data of a second data format with which the controller 80 of the recording apparatus 1 cannot generate the ejection data, whereas with which the controller 101 of the server 100 can generate the ejection data. In FIG. 11C, for example, image data with an extension "ccc" and image data with an extension "ddd" are each the image data of the second data format.

Further, the second image data selecting part 172 includes a cloud icon 173. The second image data selecting part 172 with the cloud icon 173 indicates that, a second recording function of recording an image based on the image data of the second data format is the additional function, as will be described later.

Note, however, that in the image data selecting screen 170B, the second image data selecting part 172 is displayed on the operation panel 6 in a state that the second image data selecting part 172 is not selectable, namely, in a non-selectable state. Here, in the image data selecting screen 170B, the second image data selecting part 172 includes a lock icon 174. Further, the lock icon 174 indicates that the second image data selecting part 172 is not selectable and that the recording apparatus 1 cannot execute the second recording function.

Figure 11D:
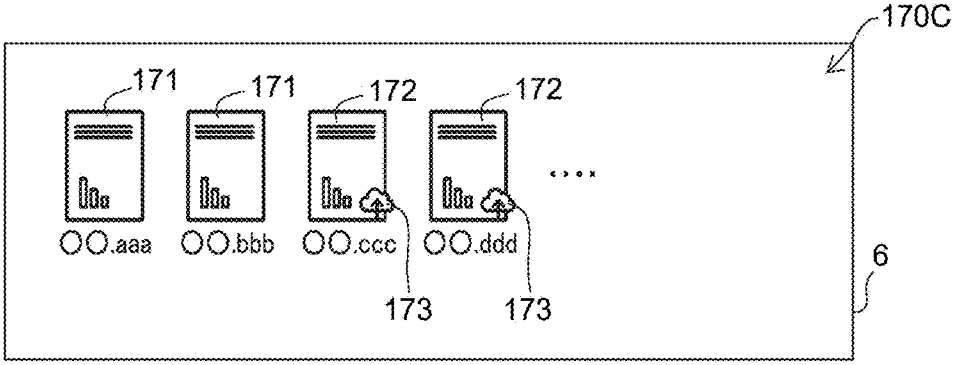
FIG. 11D is a diagram for illustrating the image data selecting screen in a case where the recording apparatus is connected to the server and the account registration has been made.

In a case where the image data selecting part 161*a* is selected in a state that the recording apparatus 1 is connected to the server 100, that the recording apparatus 1 has completed the receiving of the information regarding the additional function from the server 100 and that the account registration has been made, the controller 80 causes the operation panel 6 to display an image data selecting screen 170C depicted in FIG. 11D. The image data selecting screen 170C has a first image data selecting part 171 and a second image data selecting part 172 same as or similar to the first image data selecting part 171 and the second image data selecting part 172 of the image data selecting screen 170B of FIG. 11C.

Note, however, that in the image data selecting screen 170C, the second image data selecting part 172 is displayed on the operation panel 6 in a state that the second image data selecting part 172 is selectable, namely, in a selectable state. Further, in the image data selecting screen 170C, the second image data selecting part 172 does not include the lock icon 174. Furthermore, since the second image data selecting part 172 does not include a lock icon 174, the second image data selecting part 172 is indicated as being selectable.

In a case where any one of the first image data selecting parts 171 is selected in the image data selecting screen 170A, 170B, or 170C, and in a case where any one of the second image data selecting parts 172 is selected in the image data selecting screen 170C, the controller 80 returns the screen displayed on the operation panel 6 to the data print setting screen 160, and the controller 80 causes the "image data" in the data print setting screen 160 to indicate selected image data. For example, the controller 80 causes the "image data" in the data print setting screen 160 to indicate a file name, such as "OO.aaa" in FIGS. 16A and 16B. Further, in this situation, the controller 80 also causes the memory 84 to store information indicating that the image corresponding to the selected image data is to be recorded.

Furthermore, in a case where any one of the first image data selecting parts 171 is selected in the image data selecting screen 170A, 170B, or 170C, the controller 80 transmits, to the server 100, a signal indicating that the execution of the second recording function is not selected. Upon receiving of this signal, the controller 101 of the server 100 causes the memory 114 to store information indicating that the execution of the second recording function is not selected. Note that in the present embodiment, this signal is an example of a "second selection signal" corresponding to the second recording function.

Moreover, in a case where any one of the second image data selecting parts 172 is selected in the image data selecting screen 170C, the controller 80 transmits, to the server 100, a signal indicating that the execution of the second recording function has been selected. Upon receiving of this signal, the controller 101 of the server 100 causes the memory 114 to store information indicating that the execution of the second recording function has been selected. Note that in the present embodiment, this signal is an example of a "first selection signal" corresponding to the second recording function.

Note that in the present embodiment, each of the image data selecting screens 170A to 170C is an example of a "second screen" corresponding to the data print selecting part 123. Further, each of the plurality of first image data selecting parts 171 is an example of a "second selecting part" corresponding to the data print selecting part 123. Furthermore, the second image data selecting part 172 is an example of a "third selecting part" corresponding to the data print selecting part 123.

(Operation in a Case where the Recording Start Selecting Part is Selected)

Next, the operation in a case where the recording start selecting part 162 is selected in the data print setting screen 160 will be described.

Figure 12A:
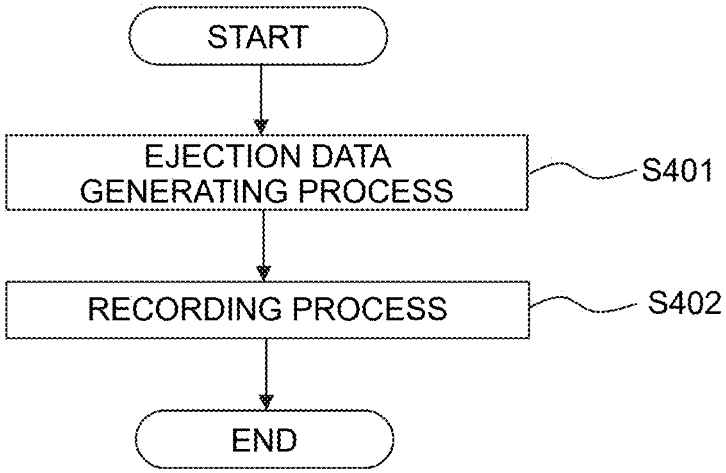
FIG. 12A is a flowchart depicting a flow of a process, in the controller of the recording apparatus, for executing a first recording function.

In a case where the recording start selecting part 162 is selected in a state that the information indicating that the image of the first data format is to be recorded is stored in the memory 84, the controller 80 of the recording apparatus 1 performs a process in accordance with the flowchart of FIG. 12A.

To provide a more detailed description, the controller 80 of the recording apparatus 1 executes an ejection data generating process (step S401). In the ejection data generating process, the controller 80 of the recording apparatus 1 generates ejection data for causing the ink-jet head 12 to eject the ink(s) from the plurality of nozzles 10, based on the image data of the selected first data format.

Next, the controller 80 of the recording apparatus 1 executes the recording process (step S402), and the controller 80 terminates the process. In the recording process of step S402, the controller 80 of the recording apparatus 1 performs the recording onto the recording sheet S by repeatedly performing the recording pass and the conveying operation. Further, in a case where the controller 80 of the recording apparatus 1 performs the recording pass, the controller 80 causes the ink-jet head 12 to eject the ink(s) from the plurality of nozzles 10, based on the ejection data generated in the ejection data generating process of step S401.

Figure 12B:
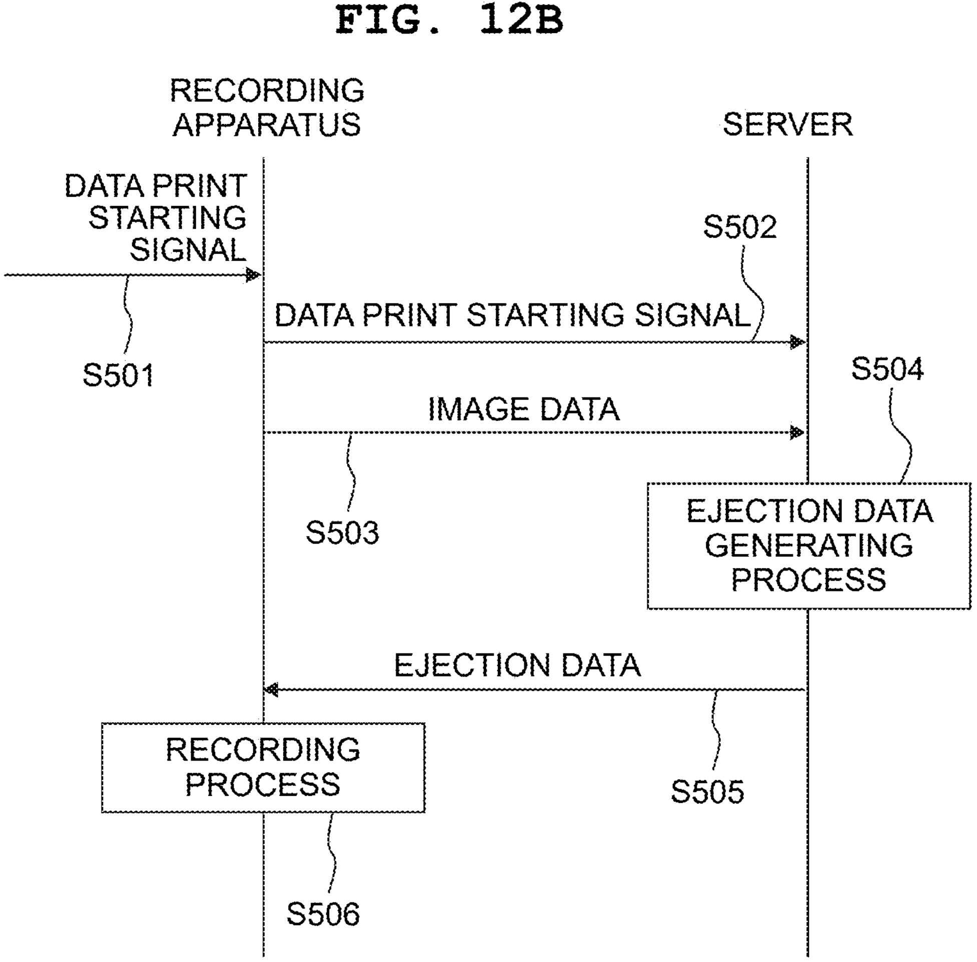
FIG. 12B is a sequence diagram depicting a flow of a process, in the controller of the recording apparatus and the controller of the server, for executing a second recording function.

In a case where the recording start selecting part 162 is selected in a state that the information indicating that the image corresponding to the second image data selecting part 172 is to be recorded is stored in the memory 84, the controller 80 of the recording apparatus 1 and the controller 101 of the server 100 perform a process in accordance with the sequence diagram of FIG. 12B.

To provide a more detailed description, in a case where the recording start selecting part 162 is selected in a state that the information indicating that an image corresponding to the second image data selecting part 172 is to be recorded is stored in the memory 84, a data print starting signal is transmitted from the operation panel 6 to the controller 80 of the recording apparatus 1 (step S501). Note that in the present embodiment, the data print starting signal transmitted in step S501 is an example of a "control instruction signal" corresponding to the second recording function.

In a case where the controller 80 of the recording apparatus 1 receives the data print starting signal from the operation panel 6, the controller 80 transmits a data print starting signal to the server 100 (step S502). Note that the signal transmitted from the recording apparatus 1 to the server 100 in step S502 is an example of a "control instruction signal". Next, the controller 80 of the recording apparatus 1 transmits image data of the selected second data format to the server 100 (step S503).

In a case where the controller 101 of the server 100 receives the data print starting signal and the image data of the second data format, the controller 101 executes an ejection data generating process (step S504). In the ejection data generating process of the step S504, the controller 101 of the server 100 generates ejection data based on the received image data of the second data format. Next, the controller 101 of the server 100 transmits the generated ejection data to the recording apparatus 1 (step S505).

In a case where the controller 80 of the recording apparatus 1 receives the ejection data, the controller 80 executes the recording process (step S506), and the controller 80 terminates the process. In the recording process of the step S506, the controller 80 of the recording apparatus 1 performs the recording onto the recording sheet S by repeatedly performing the recording pass and the conveying operation. Further, in a case where the controller 80 of the recording apparatus 1 performs the recording pass, the controller 80 causes the ink-jet head 12 to eject the ink(s) from the plurality of nozzles 10 based on the received ejection data.

Note that in the present embodiment, a first recording function of generating the ejection data based on image data stored in the external memory 91, etc., and of causing the ink-jet head 12 to eject the ink(s) from the plurality of nozzles based on the ejection data to perform recording is an example of a "basic function". Further, a second recording function of transmitting the image data stored in the external memory 91, etc., to the server 100, of receiving the ejection data generated based on the image data by the controller 101 of the server 100, and of causing the ink-jet head 12 to eject the ink(s) from the plurality of nozzles 10 based on the received ejection data to perform recording is an example of an "additional function".

(Operation in a Case where the Account Information Selecting Part is Selected)

Figure 13A:
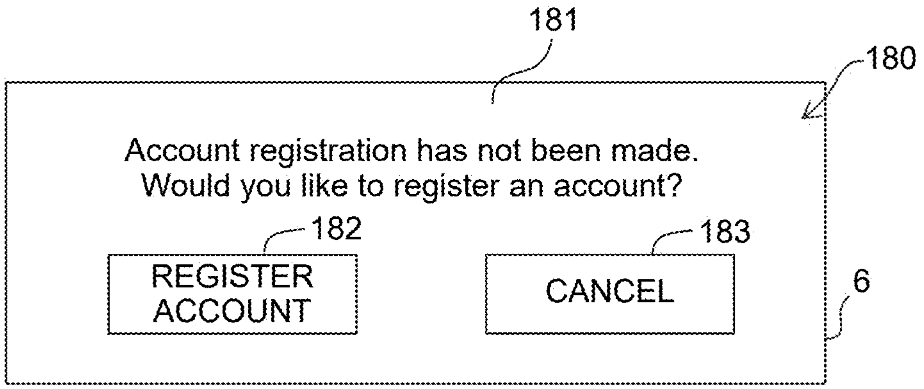
FIG. 13A is a diagram for illustrating an unregistered account screen.

Next, the operation in a case where the account information selecting part 124 is selected in the main screen 120 will be described. In a case where the account information selecting part 124 is selected in the main screen 120 in the state that the recording apparatus 1 is connected to the server 100 and the account registration has not been made, the controller 80 causes the operation panel 6 to display an unregistered account screen 180 depicted in FIG. 13A. The unregistered account screen 180 has a message part 181, a registration start selecting part 182, and a cancelation selecting part 183.

The message part 181 displays a message indicating that the account registration has not been made, and a message inquiring whether to perform the account registration. The cancelation selecting part 183 is a part selected by the user for cancelling the account registration. In a case where the cancelation selecting part 183 is selected, the controller 80 returns the display of the operation panel 6 to the main screen 120. The registration start selecting part 182 is a part selected by the user for starting account registration. In a case where the registration start selecting part 182 is selected, the controller 80 causes the operation panel 6 to display an input screen 190 depicted in FIG. 13B.

Figure 13B:
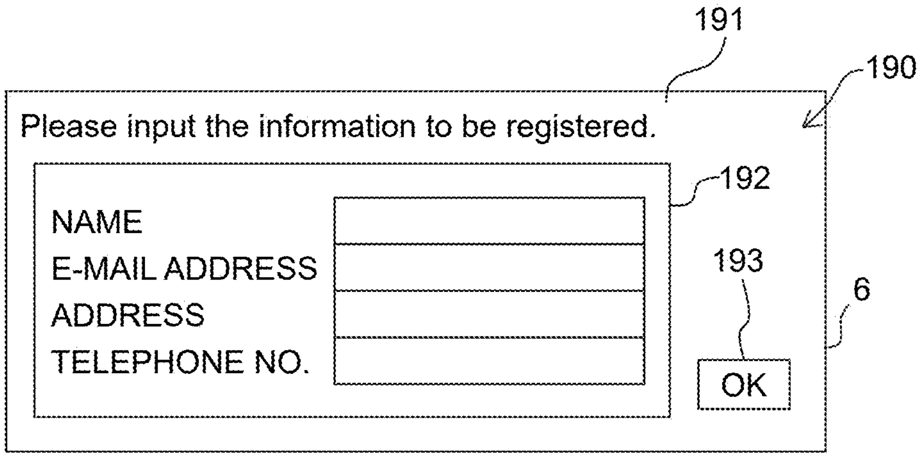
FIG. 13B is a diagram for illustrating an input screen.

The input screen 190 has a message part 191, an input part 192, and an input completion selecting part 193. The message part 191 displays a message which prompts the user to input information into the input part 192. The input part 192 is a part for inputting information required for the account registration. FIG. 13B depicts, as an example, a case where the items to be input into the input part 192 are a name, an email address, an address, and a telephone number. Further, for example, in a case where the input part 192 is selected, a non-depicted keyboard may be displayed on the operation panel 6, and the user may operate this keyboard so as to input the information into the input part 192.

The input completion selecting part 193 is a part selected by the user in a case where the input into the input section 192 is completed. In a case where the input completion selecting part 193 is selected after the input into the input section 192 is completed, the controller 80 transmits the information input into the input section 192 to the server 100, and returns the screen displayed on the operation panel 6 to the main screen 120 of FIG. 6A. Then, the server 100 performs a process of the account registration based on this information.

Note that the account registration is not limited to being performed by the operation of the operation panel 6. For example, in a case where the registration start selecting part 182 is selected, an image describing the URL of a site at which the account registration is to be performed, etc., may be recorded on the recording sheet S, and the account registration may be performed by the user operating a PC, a smartphone, etc., according to the description in this image.

Figure 13C:
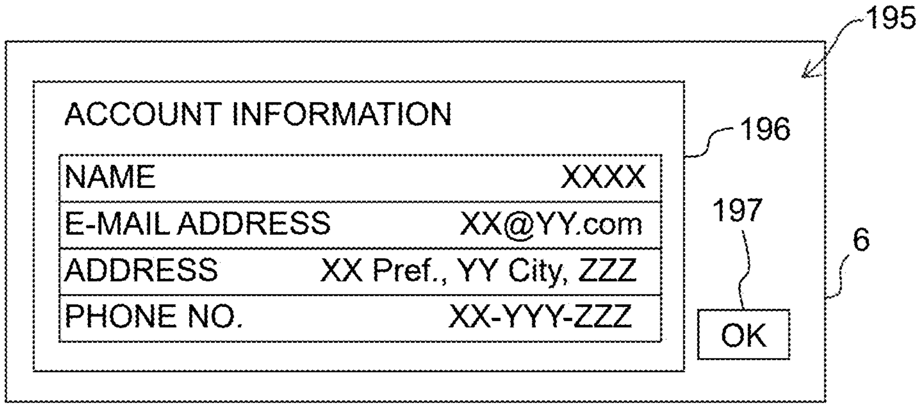
FIG. 13C is a diagram for illustrating a registration content confirming screen.

In a case where the account information selecting part 124 is selected in the main screen 120 in a state that the recording apparatus 1 is connected to the server 100 and the account registration has been made, the controller 80 causes the operation panel 6 to display a registration content confirming screen 195 depicted in FIG. 13C. The registration content confirming screen 195 has an information displaying part 196 and an end selecting part 197. The information displaying part 196 displays the information registered as the account information. FIG. 13C depicts a case where the information registered as the account information is the name, the email address, the address, and the telephone number. The end selecting part 197 is a part selected by the user so as to end the display of the account information. In a case where the end selecting part 197 is selected, the controller 80 returns the screen displayed on the operation panel 6 to the main screen 120.

Note that in the state that the recording apparatus 1 is not connected to the server 100, the main screen 120 may not have the account information selecting part 124.

Alternatively, in the state that the recording apparatus 1 is not connected to the server 100, the main screen 120 may have the account information selecting part 124, and the account information selecting part 124 may be displayed in a state that the account information selecting part 124 is not selectable, namely, in a non-selectable state. Alternatively, in the state that the recording apparatus 1 is not connected to the server 100, the main screen 120 may have the account information selecting part 124, and the account information selecting part 124 may be displayed in a state that that the account information selecting part 124 is selectable, namely, in a selectable state. In this case, in the case where the account information selecting part 124 is selected, for example, the operation panel 6 may be caused to display a screen including a message indicating that connection to the server 100 is required.

(Effects)

In the present embodiment, in the state that the recording apparatus 1 is connected to the server 100, that the recording apparatus 1 has completed the receiving of the information regarding the additional function from the server 100, and that the account registration has been made, i.e., in the state that the double-sided read data generating function can be executed in the recording apparatus 1, the scan setting screen

130C which includes the basic scan setting selecting part 131 and the double-sided scan setting-selecting part 133 and in which the double-sided scan setting-selecting part 133 is in the selectable state, is displayed on the operation panel 6. As a result, in the state that the scan setting screen 130C is displayed on the operation panel 6, the user can perform both the selection of the setting item of the single-sided read data generating function which is the basic function and the selection of the setting item of the double-sided read data generating function which is the additional function.

Further, in the present embodiment, in the state that the recording apparatus 1 is connected to the server 100, that the recording apparatus 1 has completed the receiving of the information regarding the additional function from the server 100, and that the account registration has been made, i.e., in the state that the second recording function can be executed in the recording apparatus 1, the image data selecting screen 170C which includes the first image data selecting part 171 and the second image data selecting part 172 and in which the second image data selecting part 172 is in the selectable state is displayed on the operation panel 6. As a result, in the state that the image data selecting screen 170C is displayed on the operation panel 6, the user can perform both the selection of the setting item of the first recording function which is the basic function and the selection of the setting item of the second recording function which is the additional function.

For the above-described reasons, in the present embodiment, the screen displayed on the operation panel 6 needs not to be switched between the case where the selection of the setting item of the basic function is to be made and the case where the selection of the setting item of the additional function is to be made, thereby reducing the labor required for switching the screens.

Further, in the present embodiment, the scan setting screen 130B, which includes the basic scan setting selecting part 131 and the double-sided scan setting-selecting part 133 and in which the double-sided scan setting-selecting part 133 is in the non-selectable state, is displayed on the operation panel 6, in the state that the recording apparatus 1 is connected to the server 100, and that although the recording apparatus 1 has completed the receiving of the information regarding the additional function from the server 100, the double-sided read data generating function cannot be executed in the recording apparatus 1 since the account registration has not been made. Furthermore, the scan setting screen 130A which includes the basic scan setting selecting part 131 and which does not include the double-sided scan setting-selecting part 133 is displayed on the operation panel 6, in the state that the recording apparatus 1 is not connected to the server 100 or in the state that although the recording apparatus 1 is connected to the server 100, the recording apparatus 1 has not completed the receiving of the information regarding the additional function from the server 100.

Moreover, in the present embodiment, the image data selecting screen 170B, which includes the first image data selecting part 171 and the second image data selecting part 172 and in which the second image data selecting part 172 is in the non-selectable state, is displayed on the operation panel 6, in the state that the recording apparatus 1 is connected to the server 100 and that although the recording apparatus 1 has completed the receiving of the information regarding the additional function from the server 100, the second recording function cannot be executed in the recording apparatus 1 since the account registration has not been made. Furthermore, the image data selecting screen 170A which includes the first image data selecting part 171 but which does not include the second image data selecting part 172 is displayed on the operation panel 6, in the state that the recording apparatus 1 is not connected to the server 100 or in the state that although the recording apparatus 1 is connected to the server 100, the recording apparatus 1 has not completed the receiving of the information regarding the additional function from the server 100.

For the above-described reasons, in the state that the recording apparatus 1 is connected to the server 100 and that although the recording apparatus 1 has completed the receiving of the information regarding the additional function from the server 100, the account registration has not been made, the user can understand that there is the additional function and that the additional function cannot be executed at present. On the other hand, in the state that the recording apparatus 1 has not completed the receiving of the information regarding the additional function, the scan setting screen 130A may be configured so as not to display the double-sided scan setting-selecting part 133 and the image data selecting screen 170A may be configured so as not to display the second image data selecting part 172.

Further, in the present embodiment, in the state that the scan setting screen 130C is displayed on the operation panel 6, the user can perform both the selection of the setting item of the single-sided read data generating function which is the basic function and which can be executed without the communication with the server 100 and the selection of the setting item of the double-sided read data generating function which is the additional function and which cannot be executed without the communication with the server 100. This reduces the labor of switching the screens in the case where the selection of the setting item which is common between the setting item of the single-sided read data generating function and the selection of the setting item of the double-sided read data generating function is made.

Furthermore, the user can perform both the selection of the setting item of the first recording function which is the basic function capable of being executed without the communication with the server 100, and the selection of the setting item of the second recording function which is the additional function not capable of being executed without the communication with the server 100, in the state that the image data selecting screen 170C is displayed on the operation panel 6. This reduces the labor of switching the screens in the case where the selection of the setting item which is common between the setting item of the first recording function and the setting item of the second recording function is made.

Moreover, in the present embodiment, in the recording apparatus 1 having the reading part 5 which is capable of performing the single-sided reading of reading only one surface of the document but which is not capable of performing the double-sided reading of simultaneously reading the both surfaces of the document, the read data of the one surface of the document can be generated by the single-sided read data generating function as the basic function. Further, in the recording apparatus 1 having the reading part 5 which is capable of performing the single-sided reading but which is not capable of performing the double-sided reading, the read data of the both surfaces of the document can be obtained by the double-sided read data generating function as the additional function.

Furthermore, in the present embodiment, the first recording function as the basic function is capable of recording an image corresponding to the image data of the first data format with which the controller 80 of the recording apparatus 1 can generate the ejection data. Moreover, the second recording function as the additional function is capable of recording an image corresponding to the image data of the second data format with which the controller 80 of the recording apparatus 1 cannot generate the ejection data.

Further, in the present embodiment, in the scan setting screen 130C, the double-sided scan setting-selecting part 133 for performing the setting of the double-sided read data generating function as the additional function includes the cloud icon 134. In the image data selecting screen 170C, the second image data selecting part 172 for selecting the image data of the second data format to be recorded by the second recording function as the additional function includes the cloud icon 173. With this, the user can easily understand that which one of the selecting parts corresponds to the basic function and which one of the selecting parts corresponds to the additional function, based on whether the cloud icon 134 or the cloud icon 173 is included or not.

Furthermore, in the present embodiment, the double-sided scan setting-selecting part 133, which is displayed in the non-selectable state on the scan setting screen 130B, includes the lock icon 135. In contrast, the double-sided scan setting-selecting part 133, which is displayed in the selectable state on the scan setting screen 130C does not include the lock icon 135. Moreover, the second image data selecting part 172, which is displayed in the non-selectable state on the image data selecting screen 170B, includes the lock icon 174. In contrast, the second image data selecting part 172, which is displayed in the selectable state on the image selecting screen 170C does not include the lock icon 174. With this, the user can easily understand whether the additional function is executable or not, based on whether the lock icon 134 or the lock icon 174 is included or not.

Further, in the present embodiment, in response to the receiving of the first ON signal by the server 100, the controller 101 causes the memory 114 to store the information indicating that the double-sided read data generating function as the additional function has been selected. Furthermore, in response to the receiving of the OFF signal by the server 100, the controller 101 causes the memory 114 to store the information indicating that the double-sided read data generating function as the additional function has not been selected. Furthermore, in the case where the scan start signal is received in the state that the memory 114 stores the information indicating that the double-sided read data generating function has been selected, the controller 101 performs the control in accordance with the double-sided read data generating function.

Moreover, in the present embodiment, in the server 100, by the receiving of the signal indicating that the execution of the second recording function has been selected, the controller 101 causes the memory 114 to store the information indicating that the second recording function as the additional function has been selected; and in the server 100, by the receiving of the signal indicating that the execution of the second recording function has not been selected, the controller 101 causes the memory 114 to store the information indicating that the second recording function as the additional function has not been selected. Further, in the case where the data print starting signal is received in the state that the memory 114 stores the information indicating that the second recording function has been selected, the controller 101 performs the control in accordance with the second recording function.

For the above-described reasons, the controller 101 of the server 100 can execute the process corresponding to the additional function only in the case where the additional function is selected in the recording apparatus 1.

(Modification)

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the additional function is not limited to those described in the above-described embodiment.

Figure 14A:
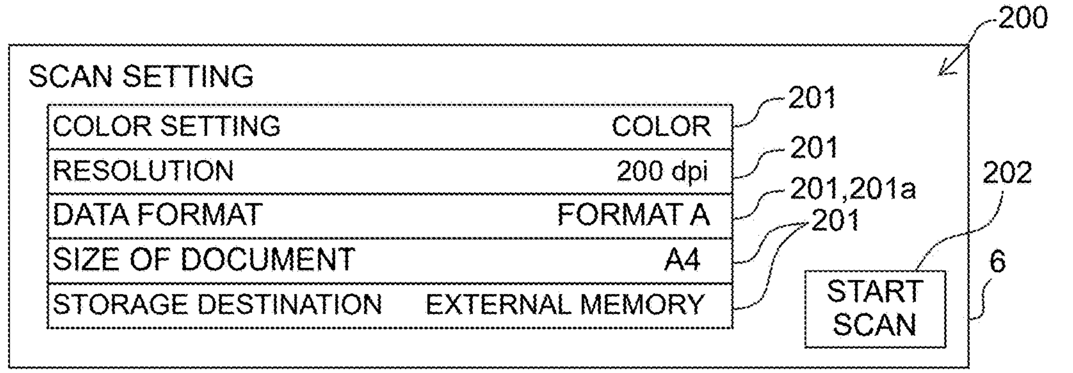
FIG. 14A is a diagram for illustrating a scan setting screen including a data format selecting part.

In a first modification, in the case where the scan selecting part 122 of the main screen 120 is selected, the controller 80 causes the operation panel 6 to display a scan setting screen 200 depicted in FIG. 14A. The scan setting screen 200 includes a plurality of scan setting selecting parts 201 and a scan start selecting part 202. The plurality of scan setting selecting parts 201 includes a data format selecting part 201*a* which is selected by the user for performing the setting of the data format of the image data to be stored. A scan setting selecting part 201, of the plurality of scan setting selecting parts 201, other than the data format selecting part 201*a* is, for example, same as or similar to the plurality of basic scan setting selecting parts 131 of the above-described embodiment. The scan start selecting part 202 is same as or similar to the scan start selecting part 132 of the above-described embodiment.

Figure 14B:
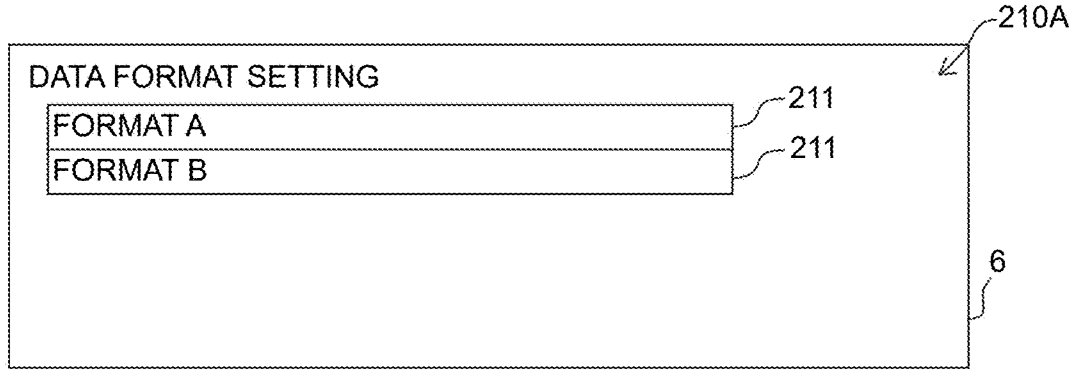
FIG. 14B is a diagram for illustrating the data format setting screen in a case where the recording apparatus is not connected to the server.

In a case where the data format selecting part 201*a* of the scan setting screen 200 is selected in a state that the recording apparatus 1 is not connected to the server 100, or in a state that the recording apparatus 1 is connected to the server 100 and that the recording apparatus 1 has not completed the receiving of the information regarding the additional function from the server 100, the controller 80 causes the operation panel 6 to display a data format selecting screen 210A depicted in FIG. 14B. The data format selecting screen 210A includes a plurality of first data format selecting parts 211. Each of the plurality of first data format selecting parts 211 is a part selected by the user for selecting a first data format which can be generated, by the controller 80 of the recording apparatus 1, from the read data obtained by the reading of the document by the reading part 5. In FIG. 14B, for example, a format A and a format B are each the first data format.

Figure 14C:
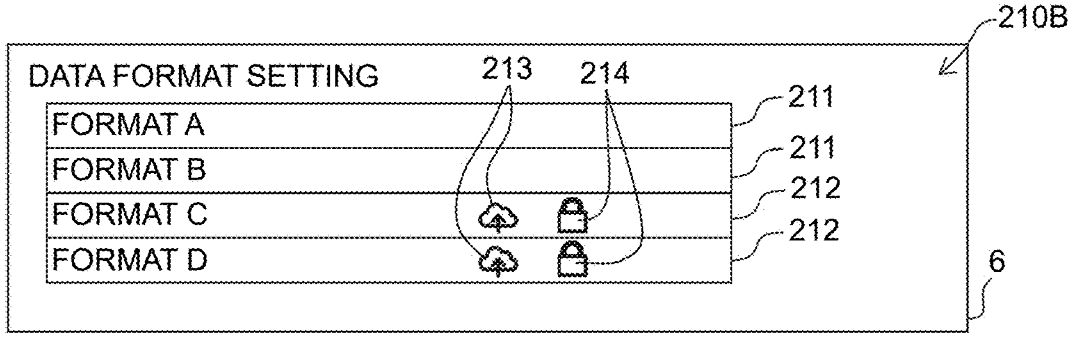
FIG. 14C is a diagram for illustrating the data format setting screen in a case where the recording apparatus is connected to the server and the account registration has not been made.

In a case where the data format selecting part 201*a* of the scan setting screen 200 is selected, in a state that the recording apparatus 1 is connected to the server 100, that the recording apparatus 1 has completed the receiving of the information regarding the additional function from the server 100 and that the account registration has not been made, the controller 80 causes the operation panel 6 to display a data format selecting screen 210B depicted in FIG. 14C. The data format selecting screen 210B includes a plurality of second data format selecting parts 212, in addition to a plurality of first data format selecting parts 211 same as or similar to the plurality of first data format selecting parts 211 of the data format selecting screen 210A. Each of the plurality of second data format selecting parts 212 is a part selected by the user for selecting a second data format which cannot be generated by the controller 80 of the recording apparatus 1 from the read data obtained by the reading of the document by the reading part 5, but which can be generated from the read data by the controller 101 of the server 100. In FIG. 14C, for example, a format C and a format D are each the second data format. Further, each of the plurality of second data format selecting parts 212 includes a cloud icon 213. Furthermore, the cloud icon 213 indicates that a second data generating function, to be described later on, of generating and storing image data of the second data format is the additional function.

Note, however, that in the data format selecting screen 210B, the plurality of second data format selecting parts 212 is displayed on the operation panel 6, in a state that the plurality of second data format selecting parts 212 is not selectable, namely, in a non-selectable state. Here, in the data format selecting screen 210B, each of the plurality of second data format selecting parts 212 includes a lock icon 214. Further, the lock icon 214 indicates that the second data format selecting part 212 is not selectable and that the recording apparatus 1 cannot execute the second data generating function.

Figure 14D:
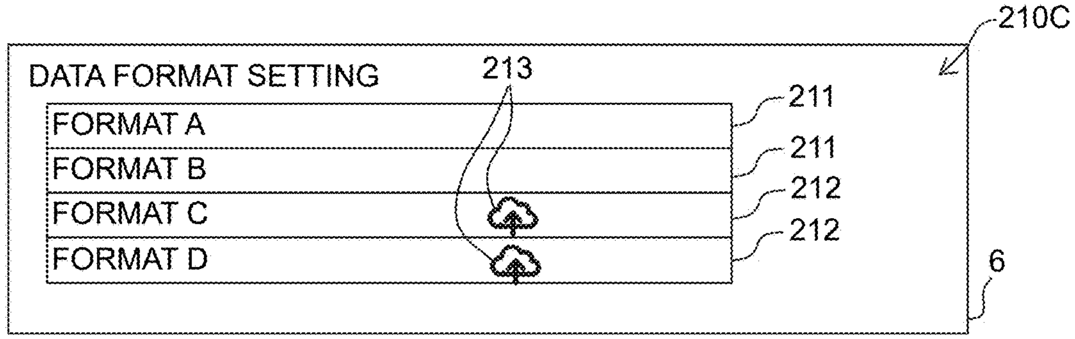
FIG. 14D is a diagram for illustrating the data format setting screen in a case where the recording apparatus is connected to the server and the account registration has been made.

In a case where the data format selecting part 201*a* of the scan setting screen 200 is selected in a state that the recording apparatus 1 is connected to the server 100, that the recording apparatus 1 has completed the receiving of the information regarding the additional function from the server 100 and that the account registration has been made, the controller 80 causes the operation panel 6 to display a data format selecting screen 210C depicted in FIG. 14D. The data format selecting screen 210C has a plurality of first data format selecting parts 211 and a plurality of second data format selecting parts 212, same as or similar to the plurality of first data format selecting parts 211 and the plurality of second data format selecting parts 212 of the data format selecting screen 210B.

Further, in the data format selecting screen 210C, the plurality of second data format selecting parts 212 is displayed in a selectable state on the operation panel 6. Here, in the data format selecting screen 210C, each of the plurality of second data format selecting parts 212 does not include the lock icon 214. Furthermore, by the second data format selecting part 212 not including the lock icon 214, the second data format selecting part 212 is indicated as being selectable.

Further, in a case where any one of the plurality of first data format selecting parts 211 is selected in the data format selecting screen 210A, 210B, or 210C, and in a case where any one of the plurality of second data format selecting parts 212 is selected in the data format selecting screen 210C, the controller 80 returns the screen displayed on the operation panel 6 to the scan setting screen 200 in such a manner that the data format selecting part 201*a* on the scan setting screen 200 indicates a selected data format. Furthermore, in this situation, the controller 80 causes the memory 84 to store information indicating the selected data format.

Moreover, in a case where any one of the plurality of first data format selecting parts 211 is selected in the data format selecting screen 210A, 210B or 210C, the controller 80 transmits, to server 100, a signal indicating that the execution of the second data generating function has not been selected. Upon receiving this signal, the controller 101 of the server 100 causes the memory 114 to store information indicating that the execution of the second data generating function has not been selected. Note that in the present embodiment, this signal is an example of a "second selection signal" corresponding to the second data generating function.

Further, in a case where any one of the plurality of second data format selecting parts 212 is selected in the data format selecting screen 210C, the controller 80 transmits, to the server 100, a signal indicating that the execution of the second data generating function has been selected. Upon receiving this signal, the controller 101 of the server 100 causes the memory 114 to store information indicating that the execution of the second data generating function has been selected. Note that in the present embodiment, this signal is an example of the "first selection signal" corresponding to the second data generating function.

Furthermore, in the first modification, in a case where the scan start selecting part 202 is selected in the scan setting screen 200 in the state that the data format indicated by the information stored in the memory 84 is the first data format, the controller 80 performs a process in accordance with the flowchart of FIG. 8A, same as or similarly to the above-described embodiment. Note that in this case, in the image data generating process of step S204, the image data of the first data format indicated by the information stored in the memory 84 is generated.

Figure 15:
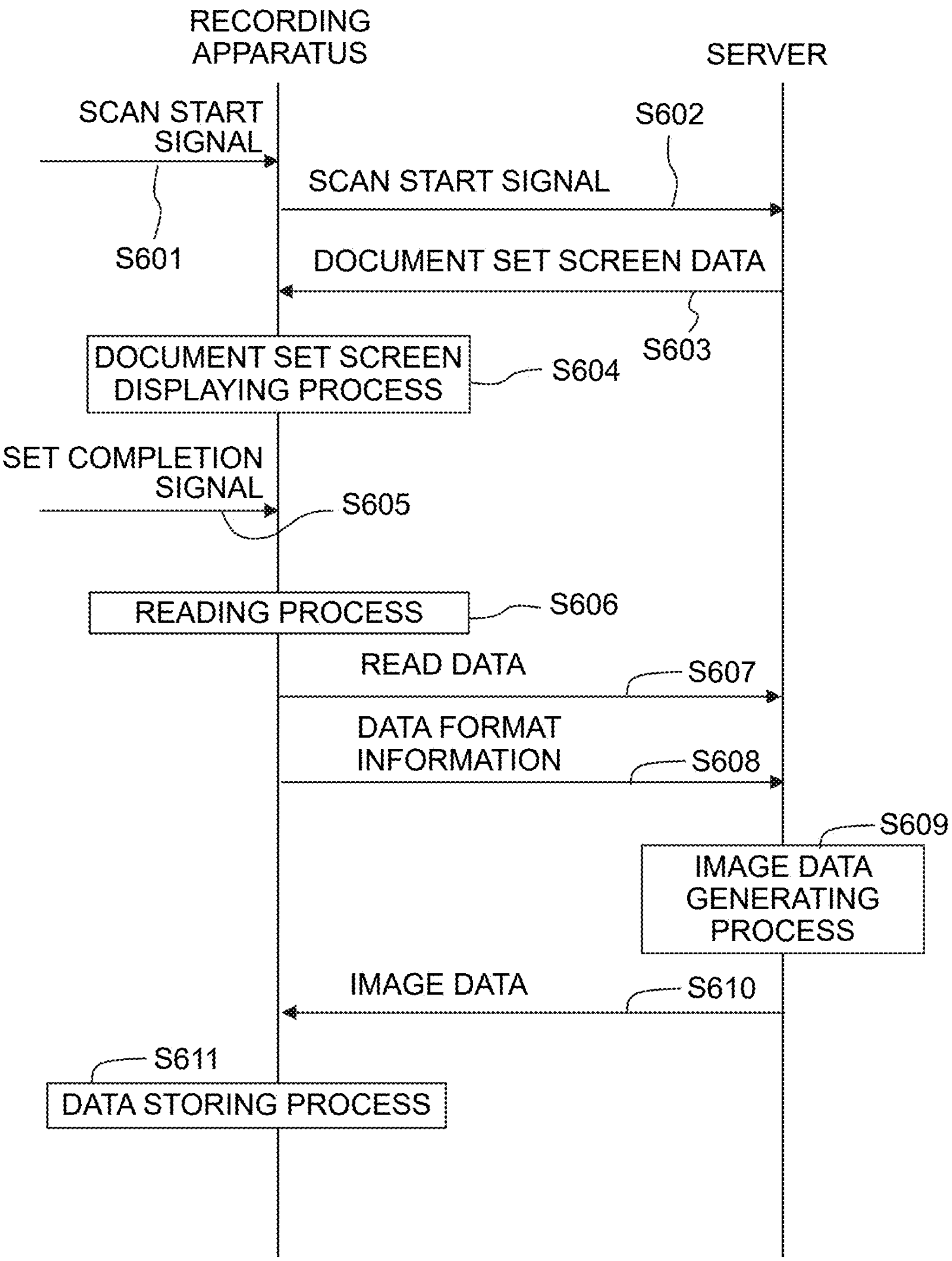
FIG. 15 is a sequence diagram depicting the flow of a process, in the controller of the recording apparatus and the controller of the server, for executing a second data generating function.

Moreover, in a case where the scan start selecting part 202 is selected in the scan setting screen 200 in the state that the data format indicated by the information stored in the memory 84 is the second data format, the controller 80 of the recording apparatus 1 and the controller 101 of the server 100 perform a process in accordance with the sequence diagram of FIG. 15.

To provide a more detailed description, in a case where the scan start selecting part 202 is selected in the scan setting screen 200 in the state that the data format indicated by the information stored in the memory 84 is the second data format, a scan start signal is transmitted from the operation panel 6 to the controller 80 of the recording apparatus 1 (step S601). In a case where the controller 80 receives the scan start signal from the operation panel 6, the controller 80 transmits a scan start signal to the server 100 (step S602). Note that in the first modification, the scan start signal transmitted from the recording apparatus 1 to the server 100 in the step S602 is an example of a "control instruction signal".

In a case where the controller 101 of the server 100 receives the scan start signal, the controller 101 transmits document set screen data to the controller 80 of the recording apparatus 1 (step S603). In a case where the controller 80 of the recording apparatus 1 receives the document set screen data, the controller 80 executes a document set screen displaying process (step S604). In the document set screen displaying process of step S604, the controller 80 of the recording apparatus 1 causes the operation screen 6 to display a document set screen, based on the received document set screen data. The document set screen is, for example, a screen same as or similar to the document set screen 140 of the embodiment described above.

In a case where the user sets document R2 in the document set part 51 and then performs an operation of selecting, in the document set screen, the completion of the setting of document R2, a set completion signal is transmitted from the operation panel 6 to the controller 80 (step S605). The phrase the "operation of selecting, in the document set screen, the completion of the setting of document R2" is, for example, an operation of selecting the set completion selecting part 142 in a case where the document set screen is the screen same as or similar to the document set screen 140 of the above-described embodiment.

In a case where the controller 80 of the recording apparatus 1 receives the set completion signal, the controller 80 executes a reading process (step S606). In the reading process, the controller 80 of the recording apparatus 1 causes the ADF 35 to convey the documents R2 set in the document set part 51 one by one, and causes the reading unit 33 to read each of the conveyed documents R2, thereby generating read data of the documents, as described above. Further, the controller 80 of the recording apparatus 1 transmits the generated read data to the server 100 (step S607), and subsequently transmits data format information which is stored in the memory 84 and which indicates the format of the data to be stored, to the server 100 (step S608).

In a case where the controller 101 of the server 100 receives the read data and the data format information, the controller 101 executes an image data generating process (step S609). In the image data generating process of the step S609, the controller 101 of the server 100 generates, based on the received read data, image data of the data format indicated by the received data format information. Further, the controller 101 of the server 100 transmits the generated image data to the recording apparatus 1 (step S610). In a case where the controller 80 of the recording apparatus 1 receives the image data, the controller 80 executes a data storing process and stores the image data in a target storage set in the scan setting screen 200, such as the external memory 91 (step S611).

Note that in the first modification, a first data generating function of generating, by the controller 80 of recording apparatus 1, the image data of the first data format based on the read data of the document read in the reading part 5 is an example of a "basic function". Further, a second data generating function of transmitting the read data of the document read in the reading part 5 to the server 100 and of receiving, from the sever 100, the image data of the second data format generated, in the controller 101 of server 100, from the read data is an example of an "additional function".

In the first modification, the data of the first data format can be generated, by the first data generating function as the basic function of the recording apparatus 1, based on the read data of the document by the reading part 5. On the other hand, by the second data generating function as the additional function of the recording apparatus 1, the read data of the document by the reading part 5 is transmitted to the server 100, and the data of the second data format which is generated based on the read data and which cannot be generated by the recording apparatus 1 based on the read data is received from the server 100. With this, the data of the second data format, which cannot be generated by the recording apparatus 1, can be obtained from the read data of the document by the reading part 5.

In a second modification, in a case where the scan selecting part 122 is selected in a state that the recording apparatus 1 is not connected to the server 100, or in a case where the recording apparatus 1 is connected to the server 100 and has not completed the receiving of the information regarding the additional function (to be described later) from the server 100, the controller 80 causes the operation panel 6 to display the scan setting screen 130A depicted in FIG. 6B, same as or similarly to the above-described embodiment.

Figure 16A:
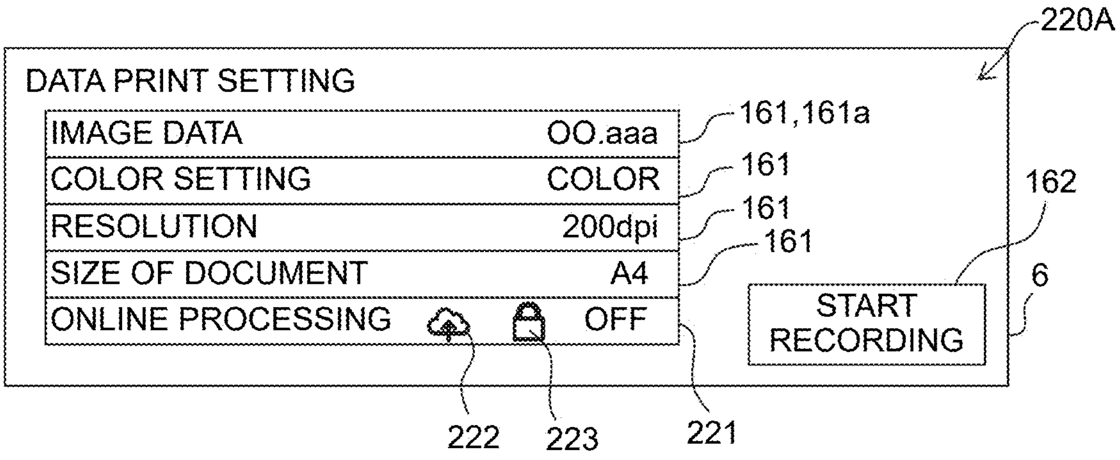
FIG. 16A is a diagram for illustrating a data print setting screen including an online process setting-selecting part which is displayed in a non-selectable state.

On the other hand, in the second modification, in a case where the data print selecting part 123 of the main screen 120 is selected in a state that the recording apparatus 1 is connected to the server 100, that the recording apparatus 1 has completed the receiving of the information regarding the additional function from the server 100 and that the account registration has not been made, the controller 80 causes the operation screen 6 to display a data print setting screen 220A depicted in FIG. 16A. The data print setting screen 220A has an online process setting-selecting part 221, in addition to a plurality of data print setting selecting parts 161 and a recording start selecting part 162 same as or similar to the plurality of data print setting selecting parts 161 and the recording start selecting part 162 of the data print setting screen 160. Note that in the second modification, the online process setting-selecting part 221 is an example of a "third selecting part".

The online process setting-selecting part 221 is a part selected by the user so as to perform setting of an online processing of transmitting image data to the server 100 and of generating ejection data in the server 100 in a case where a second recording function, which will be described later, is to be executed. Further, the online process setting-selecting part 221 has a cloud icon 222. The cloud icon 222 indicates that the online process setting-selecting part 221 relates to the second recording function which is the additional function.

Note, however, that in the online processing setting screen 220A, the online process setting-selecting part 221 is displayed, in the operation panel 6, in a state that the online process setting-selecting part 221 is not selectable, namely, in a non-selectable state. Here, in the data print setting screen 220A, the online process setting-selecting part 221 includes a lock icon 223. The lock icon 223 indicates that the online process setting-selecting part 221 is not selectable and that the recording apparatus 1 cannot execute the second recording function.

Figure 16B:
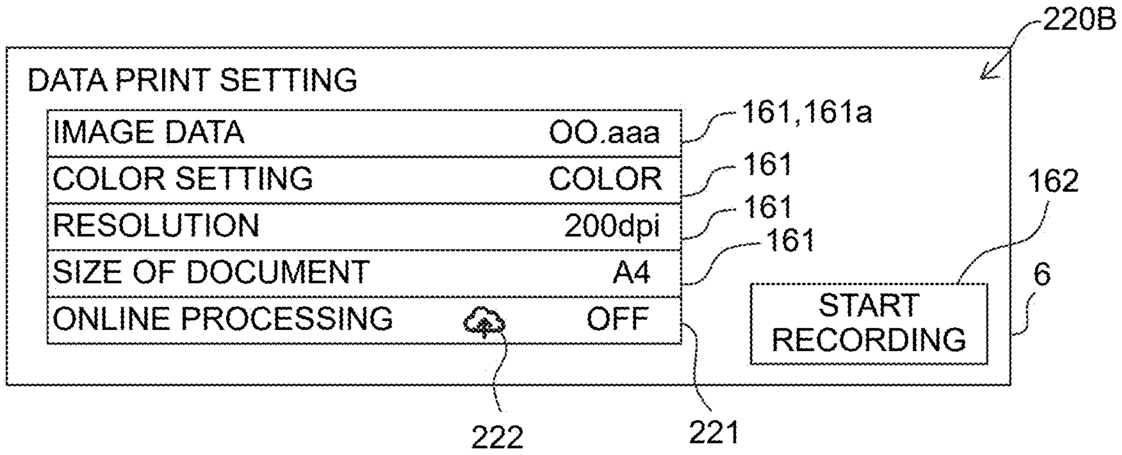
FIG. 16B is a diagram for illustrating the data print setting screen including the online process setting-selecting part which is displayed in a selectable state.

Further, in a case where the data print selecting part 123 of the main screen 120 is selected in a state that the recording apparatus 1 is connected to the server 100, that the recording apparatus 1 has completed the receiving of the information regarding the additional function from the server 100 and that the account registration has been made, a data print setting screen 220B depicted in FIG. 16B is displayed on the operation panel 6. The data print setting screen 220B has a plurality of data print setting selecting parts 161, a recording start selecting part 162, and an online process setting-selecting part 221, same as or similar to the online processing setting screen 220A in FIG. 16A.

Furthermore, in the data print setting screen 220B, the online process setting-selecting part 221 is displayed in a selectable state on the operation panel 6. Here, in the data print setting screen 220B, the online process setting-selecting part 221 does not include a lock icon 223. Non including of the lock icon 223 indicates that the online process setting-selecting part 221 is selectable.

Figure 17A:
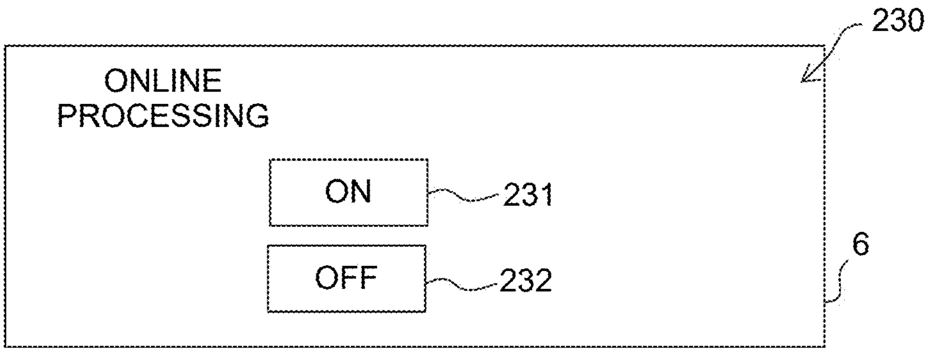
FIG. 17A is a diagram for illustrating an online process selecting screen.

In a case where the online process setting-selecting part 221 is selected in the data print setting screen 220B, the controller 80 causes the operation panel 6 to display an online processing setting-selecting screen 230 as depicted in FIG. 17A. The online processing setting-selecting screen 230 has an ON selecting part 231 and an OFF selecting part 232.

The ON selecting part 231 is a part selected by the user for turning the online processing on. In a case where the online process setting-selecting part 221 is selected in the data print setting screen 220B and further the ON selecting part 231 is selected in the online processing setting-selecting screen 230, the controller 80 returns the screen displayed on the operation panel 6 to the data print setting screen 220B, in such a manner that the online process setting-selecting part 221 in the data print setting screen 220B indicates that the online processing is ON. Further, in this situation, the controller 80 causes the memory 84 to store the information indicating that the second recording function is ON. Furthermore, in this situation, the controller 80 transmits, to the server 100, a second ON signal indicating that the second recording function is selected. Note that in the second modification, the second ON signal is an example of a “first selection signal”.

The OFF selection part 232 is a part selected by the user so as to turn the online processing off. In a case where the online process setting-selecting part 221 is selected in the data print setting screen 220B and further the OFF selecting part 232 is selected in the online processing setting-selecting screen 230, the controller 80 returns the screen displayed on the operation panel 6 to the data print setting screen 220B in such a manner that the online process setting-selecting part 221 in the data print setting screen 220B indicates that the online processing is OFF. Further, in this situation, the controller 80 causes the memory 84 to store the information indicating that the second recording function is OFF. Furthermore, in this situation, the controller 80 transmits, to the server 100, a second OFF signal indicating that the second recording function is not selected. Note that in the second modification, the second OFF signal is an example of a “second selection signal”.

Figure 17B:
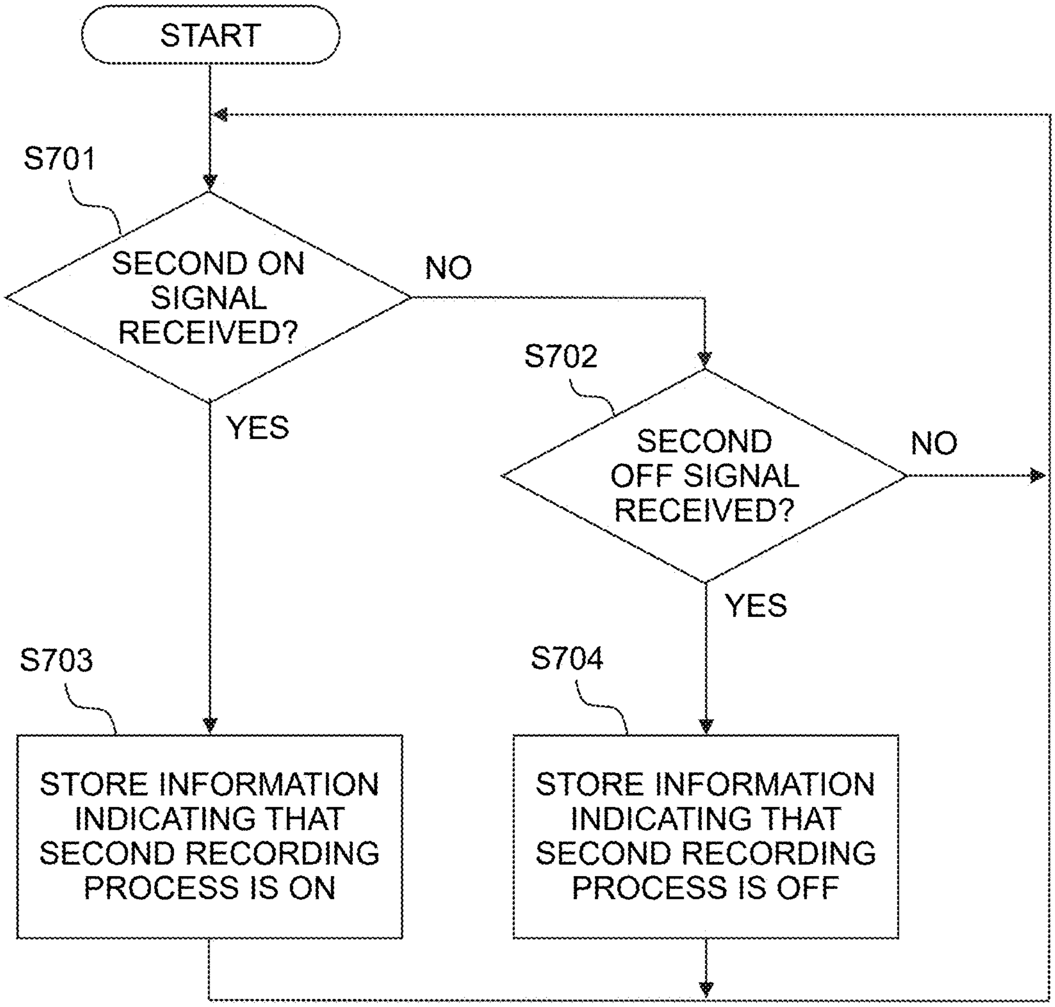
FIG. 17B is a flowchart depicting a flow of a process in the controller of the server, corresponding to selection made by a user in the online process selecting screen.

In relation to the transmission of the second ON signal and the second OFF signal from the controller 80 of the recording apparatus 1, the controller 101 of the server 100 performs the process according to the flowchart of FIG. 17B during the operation. To provide a more detailed description, the controller 101 stands by while neither the second ON signal nor the second OFF signal is received (step S701: NO, step S702: NO). In a case where the second ON signal is received (step S701: YES), the controller 101 causes the memory 114 to store the information indicating that the second recording function is ON (step S703), and the controller 100 returns the process to step S701. In a case where the second OFF signal is received (step S701: NO, step S702: YES), the controller 101 causes the memory 114 to store the information indicating that the second recording function is OFF (step S704), and the controller 100 returns the process to step S701.

Note that in the second modification, in a case where the image data selecting part 161*a* is selected in the data print setting screen 160A, 220A or 220B, for example, the image data selecting screen 170A of FIG. 11B is displayed on the operation panel 6. That is, in the second modification, the data which can be selected as the image data of the image to be recorded is data from which ejection data can be generated in the controller 80 of the recording apparatus 1. In addition, in the second modification, the data which can be selected as the image data of the image to be recorded is data from which ejection data can be generated also in the controller 101 of the server 100.

Further, in the second modification, in a case where the recording start selecting part 162 is selected in the data print setting screen 160A or 220A, and in a case where the recording start selecting part 162 is selected in the data print setting screen 220B in the state that the information indicating that the second recording function is OFF is stored in the memory 84, the controller 80 of the recording apparatus 1 performs the process in accordance with the flowchart of FIG. 12A.

In a case where the recording start selecting part 162 is selected in the data print setting screen 220B in a state that the information indicating that the second recording function is ON is stored in the memory 84, the controller 80 of the recording apparatus 1 performs, depending on the status of the recording apparatus 1, etc., the process in accordance with the flowchart in FIG. 12A, or the controller 80 of the recording apparatus 1 and the controller 101 of the server 100 perform the process in accordance with the sequence diagram in FIG. 12B.

For example, in a case where the process load of the controller 80 of the recording apparatus 1 is small, the controller 80 of the recording apparatus 1 performs the process according to the flowchart of FIG. 12A. On the other hand, in a case where the process load of the controller 80 of the recording apparatus 1 is large, the controller 80 of the recording apparatus 1 and the controller 101 of the server 100 perform the process according to the sequence diagram of FIG. 12B. Alternatively, in a case where the process load of the controller 80 of the recording apparatus 1 is large, the process performed by the controller 80 of the recording apparatus 1 according to the flowchart of FIG. 12A and the process performed by the controller 80 of the recording apparatus 1 and the controller 101 of the server 100 according to the sequence diagram of FIG. 12B may be performed in parallel. In this case, for example, the user may be allowed to set which one of the speed and the image quality is to be prioritized; in a case where a plurality of data print instructions are input in succession, the ejection data may be generated by the controller 80 of recording apparatus 1 with respect to data print for which the speed is prioritized, and ejection data may be generated by controller 101 of server 100 for data print for which the image quality is prioritized.

Note that in the second modification, the first recording function of generating the ejection data based on image data in the controller 80 of the recording apparatus 1 and of causing the ink-jet head 12 to eject the ink(s) from the plurality of nozzles 10 based on the ejection data to thereby perform the recording is an example of the “basic function”. Further, the second recording function of transmitting the image data to the server 100, of receiving the ejection data generated by the controller 101 of the server 100 based on the image data, and of causing the ink-jet head 12 to eject the ink(s) from the plurality of nozzles 10 based on the received ejection data to thereby perform the recording is an example of the “additional function”.

In the second modification, the first recording function as the basic function enables the controller 80 of the recording apparatus 1 to generate the ejection data and to perform the recording, and the second recording function as the additional function enables the controller 80 to receive the ejection data generated by the server 100 and to perform the recording. Thus, in the second modification, depending on the status of the recording apparatus 1, etc., the ejection data can be generated by either one of the controller 80 of the recording apparatus 1 and the controller 101 of the server 100.

Further, by connecting the recording apparatus 1 to the server 100, one additional function or any two or more additional functions among the additional functions described in the foregoing examples may be made executable in the recording apparatus 1. Furthermore, by connecting the recording apparatus 1 to the server 100, the recording apparatus 1 may be configured to be capable of executing another additional function(s) other than the additional functions as described above.

Further, in the above-described examples, the basic function is the function which can be executed without the communication with the server 100, whereas the additional function is the function which cannot be executed without the communication with the server 100. Note, however, that the present disclosure is not limited to this. The additional function may be a function which can be executed without a communication with the server 100. For example, in the state that the recording apparatus 1 is connected to the server 100 and that the account registration has been made, the recording apparatus 1 may receive, from the server 100, data such as a program for executing the additional function, automatically or in response to an operation of the operation panel 6 by the user. In this case, after the recording apparatus 1 is once connected to the server 100 and receives the data such as the program for executing the additional function, the recording apparatus 1 can execute the additional function even if the recording apparatus 1 is not connected to the server 100. In the present disclosure, the wording of "a function configured to become executable by the image handling apparatus after the image handling apparatus has been connected to an external apparatus" includes a function which is executable by the image handling apparatus in a state that the image handling apparatus is connected to the external apparatus and a function which is executable by the image handling apparatus in a state that the image handling apparatus once having been connected to the external apparatus is not connected to the external apparatus.

Further, in the above-described embodiment, in a case where the double-sided scan setting-selecting part 133 is selected, the double-sided scan selecting screen 135 having the ON selecting part 136 and the OFF selecting part 137 is displayed on the operation panel 6. Then, in a case where the controller 101 of the server 100 receives the first ON signal transmitted from the recording apparatus 1 by the selection of the ON selecting part 136, the controller 101 of the server 100 causes the memory 114 to store the information indicating that the double-sided read data generating function is ON. Furthermore, in a case where the controller 101 of the server 100 receives the first OFF signal transmitted from the recording apparatus 1 by the selection of the OFF selecting part 137, the controller 101 of the server 100 causes the memory 114 to store the information indicating that the double-sided read data generating function is OFF. Note, however, that the present disclosure is not limited to this.

In a third modification, in a case where double-sided scan setting-selecting part 133 is selected in the scan setting screen 130C depicted in FIG. 6D in a state that the information indicating that the double-sided read data generating function is OFF is stored in the memory 84, the controller 80 is configured to cause the double-sided scan setting-selecting part 133 in scan setting screen 130C to indicate that the double-sided read data generating function is ON. Further, in this situation, the controller 80 causes the memory 84 to store the information indicating that the double-sided read data generating function is ON.

Furthermore, in a case where double-sided scan setting-selecting part 133 is selected in the scan setting screen 130C in a state that the information indicating that the double-sided read data generating function is ON is stored in the memory 84, the controller 80 is configured to cause the double-sided scan setting-selecting part 133 in scan setting screen 130C to indicate that the double-sided read data generating function is OFF. Moreover, in this situation, the controller 80 causes the memory 84 to store the information indicating that the double-sided read data generating function is OFF.

Further, in the third modification, in a case where double-sided scan setting-selecting part 133 is selected in the scan setting screen 130C, regardless of whether the information indicating that the double-sided read data generating function is ON is stored in the memory 84 or the information indicating that the double-sided read data generating function is OFF is stored in the memory 84, the controller 80 transmits, to the server 100, a switching signal indicating that ON and OFF of the double-sided read data generating function has been switched.

Figure 18:
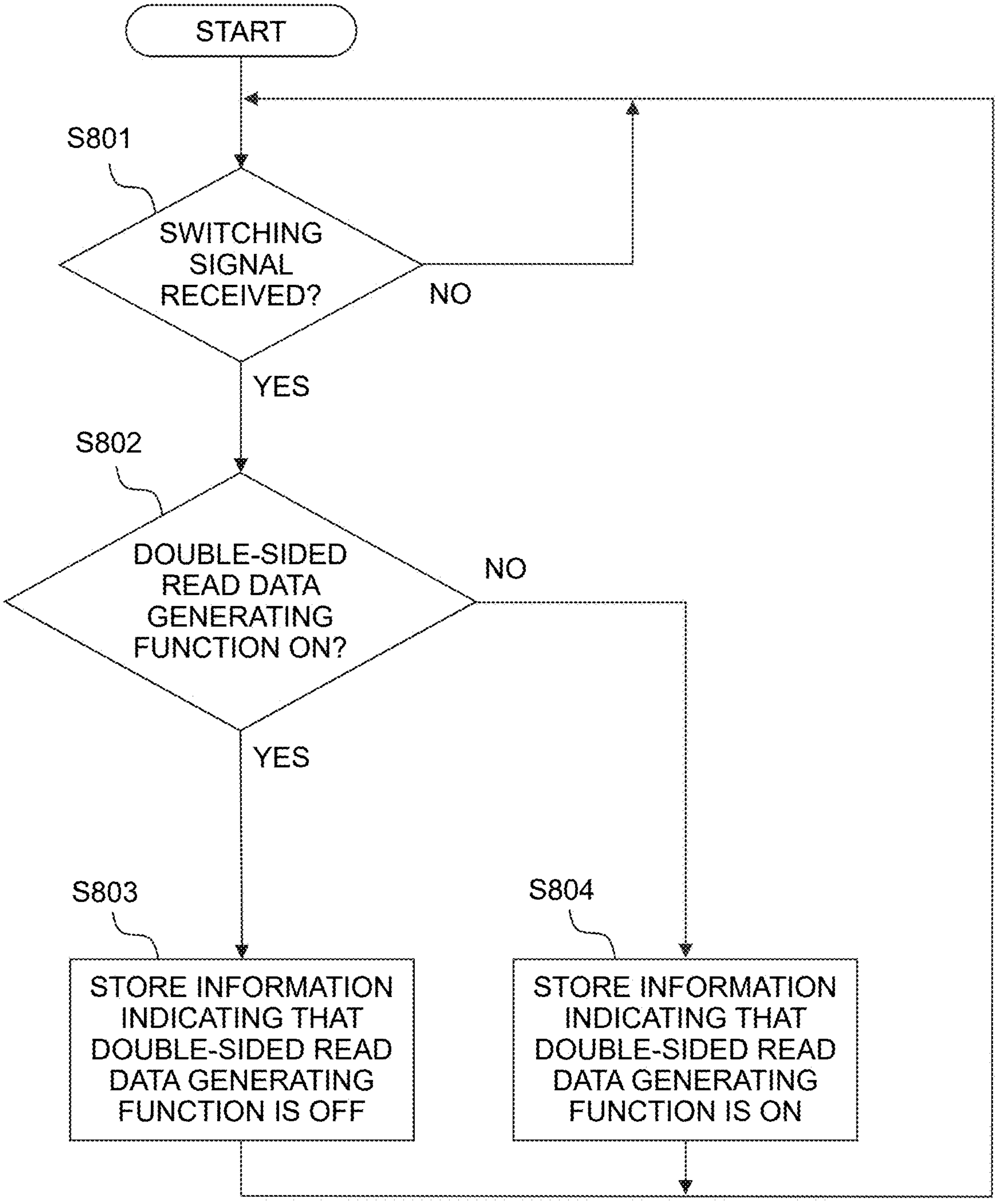
FIG. 18 is a flowchart depicting a flow of a process, in the controller of the server, corresponding to the selection of a double-sided scan setting-selecting part.

Corresponding to this, in the third modification, the controller 101 of the server 100 performs a process according to the flowchart of FIG. 18, instead of the process according to the flowchart of FIG. 7B of the above-described embodiment. To provide a more detailed description, the controller 101 of the server 100 stands by in a period in which the controller 101 does not receive the switching signal from the recording apparatus 1 (step S801: NO). In a case where the controller 101 receives the switching signal (step S801: YES), and where the information indicating that the double-sided read data generating function is ON is stored in the memory 114 (step S802: YES), the controller 101 of the server 100 causes the memory 114 to store the information indicating that the double-sided read data generating function is OFF (step S803). In a case where the controller 101 receives the switching signal (step S801: YES), and where the information indicating that the double-sided read data generating function is OFF is stored in the memory 114 (step S802: NO), the controller 101 of the server 100 causes the memory 114 to store the information indicating that the double-sided read data generating function is ON (step S804). That is, in the third modification, each time the server 100 receives the switching signal, the controller 101 performs the switching between the state that the information indicating that the double-sided read data generating function is OFF is stored in the memory 114 and the state that the information indicating that the double-sided read data generating function is ON is stored in the memory 114.

In the third modification, in the case where the controller 101 receives the switching signal in the state that the information indicating that the double-sided read data generating function as the additional function is ON is not stored in the memory 114, the controller 101 causes the memory 114 to store the information indicating that the double-sided read data generating function is ON. Further, in the case where the controller 101 receives the switching signal in the state that the information indicating that the double-sided read data generating function as the additional function is OFF is not stored in the memory 114, the controller 101 causes the memory 114 to store the information indicating that the double-sided read data generating function is OFF. Furthermore, in a case where the controller 101 receives the scan starting signal in the state that the information indicating that the double-sided read data generating function is selected is stored in the memory 114, the controller 101 performs a control in accordance with the double-sided read data generating function. With this, the process in accordance with the additional function can be executed only in a case where the double-sided read data generating function is ON in the recording apparatus 1.

Moreover, in the above-described examples, in a case where the additional function is to be executed, a signal indicating the start of execution of the additional function is transmitted. The term "signal indicating the start of execution of the additional function" means the scan starting signal transmitted in steps S302 and S602 and the data print starting signal transmitted in step S502. In contrast, in a case where the basic function is to be executed, the signal indicating the start of the process is not transmitted from the recording apparatus 1 to the server 100. Note, however, that the present disclosure is not limited to this.

For example, also in the case where the basic function is to be executed, the recording apparatus 1 may transmit a signal indicating the start of the process to the server 100. In this case, for example, the server 100 which has received this signal may transmit a signal to the recording apparatus 1 indicating that the process to be executed is not regarding the additional function.

Further, in the above-described examples, in the state that the additional function can be executed, an additional function selecting part for performing the selection regarding the additional function is displayed in the state that the additional function selecting part is in the selectable state. Furthermore, provided that a predetermined condition is a condition that the recording apparatus 1 has completed the receiving of the information regarding the additional function from the server 100, in a case where the recording apparatus 1 is in the state that the recording apparatus 1 cannot execute the additional function and that the recording apparatus 1 is connected to the server 100, the additional function selecting part for performing the selection regarding the additional function is displayed in the non-selectable state if the predetermined condition is satisfied; whereas the additional function selecting part for performing the selection regarding the additional function is not displayed if the predetermined condition is not satisfied. Note, however, that the present disclosure is not limited to this.

For example, a condition, which is different from either the condition that the additional function can be executed or the condition that the recording apparatus 1 has completed the receiving of the information regarding the additional function from the server 100, may be defined as the predetermined condition.

Alternatively, for example, in the state that the additional function can be executed, the selecting part for performing the selection regarding the additional function may be displayed in the selectable state; whereas in the state that the additional function cannot be executed, the selecting part for performing the selection regarding the additional function may not be displayed, regardless of other conditions.

Still alternatively, for example, regardless of whether the additional function can be executed, the selecting part for performing the selection regarding the additional function may be displayed in the selectable state. Then, in a case where the selecting part for performing the selection regarding the additional function is selected in the state that the additional function cannot be executed, a screen including a message indicating that the additional function cannot be executed, a message indicating a method for making the additional function executable, etc., may be displayed.

Further, in the foregoing examples, the additional function selecting part for performing the selection regarding the additional function is configured to include the cloud icon as the first icon indicating the relation to the additional function, and the selecting part for performing the selection regarding the basic function is configured not to include the cloud icon. The present disclosure, however, is not limited to this.

For example, the selecting part for performing the selection regarding the additional function may be configured to include another first icon which is different from the cloud icon. Further, both the selecting part for performing the selection regarding the basic function and the selecting part for performing the selection regarding the additional function may be configured not to include the first icon.

Furthermore, in the above-described examples, the additional function selecting part for performing the selection regarding the additional function is configured to include the lock icon as the second icon in a case where the additional function selecting part is displayed in the non-selectable state, and is configure not to include the lock icon as the second icon in a case where the additional function selecting part is displayed in the selectable state. The present disclosure, however, is not limited to this.

For example, the selecting part for performing the selection regarding the additional function may be configured to include another second icon which is different from the lock icon in a case where the selecting part is displayed in the non-selectable state. Alternatively, the selecting part for performing the selection regarding the additional function may be configured to include different icons between a case where the selecting part is displayed in the selectable state and a case where the selecting part is displayed in the non-selectable state. Still alternatively, in a case where the selecting part for performing the selection regarding the additional function is displayed in the non-selectable state, whether the selecting part for performing the selection regarding the additional function is in the selectable state or not may be indicated by an aspect without using any icon, for example, by displaying the selecting part for performing the selection regarding the additional function in a gray-out manner.

Further, in the above-described examples, whether or not the account has been registered determines whether all additional functions can be executed or none of the additional functions can be executed. The present disclosure, however, is not limited to this. For example, the account may include accounts of a plurality of types, and the additional functions which can be executed may differ depending on the type of account. The types of accounts may include, for example, a free account and a paid account, a plurality of types of paid accounts with different fees. Alternatively, for example, in a case where the recording apparatus 1 is connected to the server 100 and where the recording apparatus 1 has completed the receiving of the information regarding the additional function from the server 100, at least a part of the additional functions may be executable, regardless of whether or not the account has been registered. Still alternatively, for example, whether the additional functions can be executed or not may be determined depending on whether a condition other than the account registration is satisfied or not.

Furthermore, in the above-described examples, the external apparatus to which the recording apparatus 1 connects in order to execute the additional function is the server 100. However, the present disclosure is not limited to this. The external apparatus to which the recording apparatus 1 connects in order to execute the additional function may be an apparatus other than a server, such as a PC.

Moreover, in the foregoing, the example wherein the present disclosure is applied to a printer including a so-called serial head which ejects the ink(s) from the plurality of nozzles while moving in the scanning direction together with the carriage has been described. However, the present disclosure is not limited to this. For example, the present disclosure is also applicable to a printer including a so-called line head which extends over the entire length of the recording sheet in the scanning direction.

Further, in the foregoing, the recording part 2 of the recording apparatus 1 is the ink-jet printer which ejects the ink(s) from the nozzles so as to perform recording on the recording sheet S. The present disclosure, however, is not limited to this. For example, the recording part of the recording apparatus may be different from the ink-jet printer, such as a laser printer, a thermal printer, etc.

In the recording apparatus 1, the recording part 2 and/or the reading part 5 may be omitted. An apparatus having the recording part 2 and/or the reading part 5 is an example of an "image handling apparatus". Each of the recording part 2 and the reading part 5 is an example of an "image handler".

What is claimed is:

1. An image handling apparatus comprising:

an image handler configured to perform reading of a document and/or recording of an image to a medium;

a display;

an interface configured to be operated by a user; and a controller configured to:

perform control regarding an additional function and a basic function, the additional function being a function configured to become executable by the image handling apparatus after the image handling apparatus has been connected to an external apparatus, the basic function being a function executable by the image handling apparatus before and after the image handling apparatus has been connected to the external apparatus;

cause the display to display a first screen including a first selecting part configured to be selected by operating of the interface by the user to select the basic function;

cause the display to display, in response to selecting of the first selecting part, a second screen including a second selecting part configured to be selected by the operating of the interface by the user to select a setting item of the basic function corresponding to the first selecting part; and cause the display to display the second screen in a state that a third selecting part configured to be selected by the operating of the interface by the user to select a setting item corresponding to the additional function is included in the second screen, in a case where the second screen is displayed on the display.

2. The image handling apparatus according to claim 1, wherein the controller is configured to:

cause the display to display the second screen including the second selecting part and the third selecting part in a state that the third selecting part is selectable, in a case where the controller causes the display to display the second screen under a state that the additional function is executable by the image handling apparatus; and cause the display to display the second screen including the second selecting part and the third selecting part in a state that the third selecting part is not selectable, in a case where the controller causes the display to display the second screen under a state that the additional function is not executable by the image handling apparatus.

3. The image handling apparatus according to claim 2, wherein the controller is configured to:

cause the display to display the second screen including the second selecting part and not including the third selecting part, in a case where the second screen is displayed under a state that the additional function is not executable by the image handling apparatus, the image handling apparatus is connected to the external apparatus, and the image handling apparatus does not fulfill a display permitting condition for permitting the displaying of the third selecting part; and cause the display to display the second screen including the second selecting part and the third selecting part in the state that the third selecting part is not selectable, in a case where the second screen is displayed under a state that the additional function is not executable by the image handling apparatus, the image handling apparatus is connected to the external apparatus, and the image handling apparatus fulfills the display permitting condition.

4. The image handling apparatus according to claim 2, wherein the controller is configured to:

cause the display to display the second screen including the third selecting part including a second icon indicating that the additional function is not executable by the image handling apparatus, in a case where the controller causes the display to display the second screen including the third selecting part in the state that the third selecting part is not selectable; and cause the display to display the second screen including the third selecting part not including the second icon, in a case where the controller causes the display to display the second screen including the third selecting part in the state that the third selecting part is selectable.

5. The image handling apparatus according to claim 1, wherein:

the basic function is a function executed by the image handling apparatus without communication between the image handling apparatus and the external apparatus; and the additional function is a function executed by the image handling apparatus based on the communication between the image handling apparatus and the external apparatus.

6. The image handling apparatus according to claim 5, wherein:

the image handler is configured to perform the reading of the document;

the basic function is related to the reading of the document by the image handler, the image handling apparatus executing the basic function without transmitting read data obtained by the reading of the document to the external apparatus; and the additional function is related to the reading of the document by the image handler, the image handling apparatus transmitting the read data obtained by the reading of the document to the external apparatus for executing the additional function.

7. The image handling apparatus according to claim 6, wherein:

the image handler is configured to perform a single-sided reading of reading only one surface of the document, and does not have a function of performing a double-sided reading of reading both surfaces of the document at a time;

the basic function is a single-sided read data generating function of generating read data of the one surface of the document read by the single-sided reading; and the additional function is a double-sided read data generating function of:

transmitting, to the external apparatus, the read data of the one surface of the document read by the single-sided reading and read data of an opposite surface of the document read by the single-sided reading; and receiving, from the external apparatus, read data of both surfaces of the document generated based on the read data of the one surface of the document and the read data of the opposite surface of the document.

8. The image handling apparatus according to claim 6, wherein:

the basic function is a first data generating function of generating data of a first data format based on the read data of the document read by the image handler; and the additional function is a second data generating function of:

transmitting, to the external apparatus, the read data of the document read by the image handler; and receiving, from the external apparatus, data of a second data format generated based on the read data, the image handling apparatus not having a function of generating data of the second data format based on the read data.

9. The image handling apparatus according to claim 5 further comprising a memory configured to store image data, wherein:

the image handler is configured to perform the recording of the image to the medium, the basic function is a first recording function of:

generating recording data for operating the image handler based on the image data stored in the memory; and operating the image handler based on the recording data so as to perform the recording of the image to the medium; and the additional function is a second recording function of:

transmitting the image data stored in the memory to the external apparatus;

receiving the recording data generated based on the image data from the external apparatus; and operating the image handler based on the recording data received from the external apparatus so as to perform the recording of the image to the medium.

10. The image handling apparatus according to claim 1, wherein:

the third selecting part includes a first icon indicating that the third selecting part corresponds to the additional function; and the second selecting part does not include the first icon.

11. An external apparatus configured to communicate with the image handling apparatus as defined in claim 1, comprising:

a memory; and a controller configured to:

cause the memory of the external apparatus to store information indicating that execution of the additional function is selected in the image handling apparatus, in response to receiving of a first selection signal from the image handling apparatus, cause the memory of the external apparatus to store information indicating that the execution of the additional function is not selected in the image handling apparatus, in response to receiving of a second selection signal different from the first selection signal from the image handling apparatus, and perform control regarding the additional function, in response to receiving of a control instruction signal different from both the first selection signal and the second selection signal under a state that the information indicating that the execution of the additional function is selected is stored in the memory of the external apparatus.

12. An external apparatus configured to communicate with the image handling apparatus as defined in claim 1, comprising:

a memory; and a controller configured to:

cause the memory of the external apparatus to store information indicating that execution of the additional function is selected in the image handling apparatus, in response to receiving of a selection signal from the image handling apparatus under a state that information indicating that execution of the additional function is not selected in the image handling apparatus is stored in the memory of the external apparatus;

cause the memory of the external apparatus to store information indicating that execution of the additional function is not selected in the image handling apparatus, in response to receiving of the selection signal from the image handling apparatus under a state that the information indicating that execution of the additional function is selected in the image handling apparatus is stored in the memory of the external apparatus; and perform control regarding the additional function, in response to receiving of a control instruction signal different from the selection signal under a state that the information indicating that the execution of the additional function is selected is stored in the memory of the external apparatus.

13. An information displaying method executed by a controller of an image handling apparatus, the image handling apparatus including:

an image handler configured to perform reading of a document and/or recording of an image on a medium;

a display;

an interface configured to be operated by a user; and the controller, the method comprising:

causing the display to display a first screen including a first selecting part configured to be selected by operating of the interface by the user to select a basic function executable by the image handling apparatus before and after the image handling apparatus has been connected to an external apparatus;

causing the display to display, in response to selecting of the first selecting part, a second screen including a second selecting part configured to be selected by the operating of the interface by the user to select a setting item of the basic function corresponding to the first selecting part; and causing the display to display the second screen in a state that a third selecting part configured to be selected by the operating of the interface by the user to select a setting item corresponding to an additional function is included in the second screen, in a case where the second screen is displayed on the display, the additional function being a function configured to become executable by the image handling apparatus after the image handling apparatus has been connected to an external apparatus.

14. A non-transitory and computer-readable medium storing a program executable by a controller of an image handling apparatus, the image handling apparatus including:

an image handler configured to perform reading of a document and/or recording of an image on a medium;

a display;

an interface configured to be operated by a user; and the controller, the program is configured to cause the controller to execute:

causing the display to display a first screen including a first selecting part configured to be selected by operating of the interface by the user to select a basic function executable by the image handling apparatus before and after the image handling apparatus has been connected to an external apparatus;

causing the display to display, in response to selecting of the first selecting part, a second screen including a second selecting part configured to be selected by the operating of the interface by the user to select a setting item of the basic function corresponding to the first selecting part; and causing the display to display the second screen in a state that a third selecting part configured to be selected by the operating of the interface by the user to select a setting item corresponding to an additional function is included in the second screen, in a case where the second screen is displayed on the display, the additional function being a function configured to become executable by the image handling apparatus after the image handling apparatus has been connected to an external apparatus.

* * * * *